United States Patent [19]

Morinaga

[11] 4,346,434
[45] Aug. 24, 1982

[54] APPARATUS FOR CONTROLLING AN ELECTRIC MOTOR

[75] Inventor: Shigeki Morinaga, Hitachi, Japan

[73] Assignee: Hitachi, Ltd., Tokyo, Japan

[21] Appl. No.: 131,483

[22] Filed: Mar. 18, 1980

[30] Foreign Application Priority Data

Mar. 20, 1979 [JP] Japan .................................. 54-32571

[51] Int. Cl.³ ....................... G06F 15/46; H02P 5/06
[52] U.S. Cl. .................................. 364/183; 318/341;
318/345 E; 364/174; 364/400
[58] Field of Search ............... 364/110, 107, 118, 400,
364/130, 167, 174, 183, 140, 400; 318/341, 345
E, 310, 327, 329, 696, 599

[56] References Cited

U.S. PATENT DOCUMENTS

| | | | |
|---|---|---|---|
| 4,090,115 | 5/1978 | Franz, Jr. .................. | 318/345 E X |
| 4,090,116 | 5/1978 | Lippitt ............................ | 364/118 X |
| 4,153,863 | 5/1979 | Schachte et al. ................... | 318/341 |
| 4,218,735 | 8/1980 | McCutcheon ...................... | 364/118 |

Primary Examiner—Joseph F. Ruggiero
Attorney, Agent, or Firm—Craig and Antonelli

[57] ABSTRACT

There is disclosed an apparatus for controlling an electric motor, which comprises a plurality of detectors for detecting the operating conditions of an electric motor, a digital computing circuit for digitally operating on the detection signals from the detectors to produce various digital control amounts, reference register groups for storing the various digital control amounts or predetermined values as reference data, an instantaneous register group for storing a plurality of instantaneous data indicative of the instantaneous operating conditions of the electric motor, a comparison circuit for comparing the corresponding reference and instantaneous data for each stage, a circuit for storing the comparison result from the comparison circuit, an incrementer/decrementer for increasing or decreasing the instantaneous data by a unit value for each stage, and a stage counter for enabling the comparison circuit to compare the various reference data with the corresponding instantaneous data in a time-divisional manner, whereby the comparison circuit and the incrementer/decrementer are used in common for the various data, thereby to ensure accurate speed control of an electric motor and the production of the output pulses required for controlling the motor in accordance with the operating conditions of the motor by means of a relatively simple circuitry.

60 Claims, 31 Drawing Figures

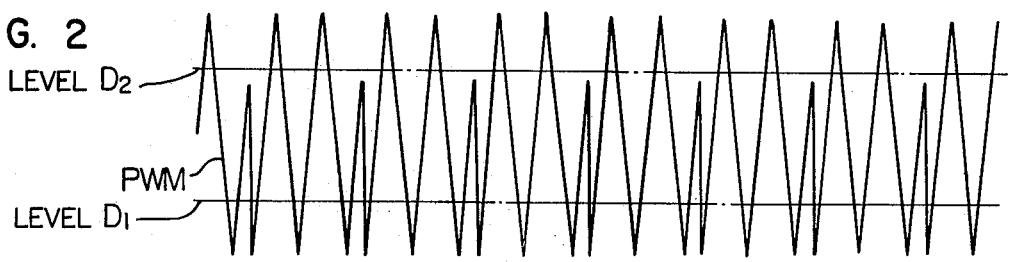
FIG. 2
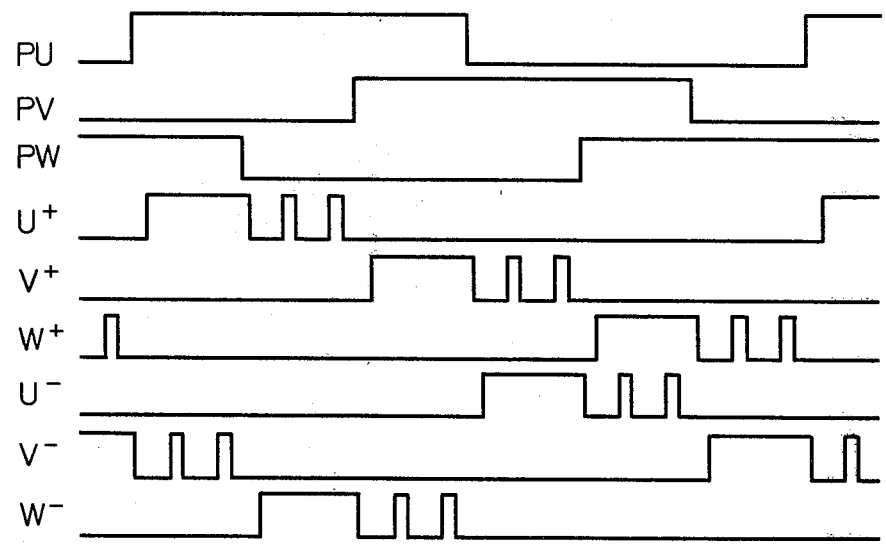
FIG. 4
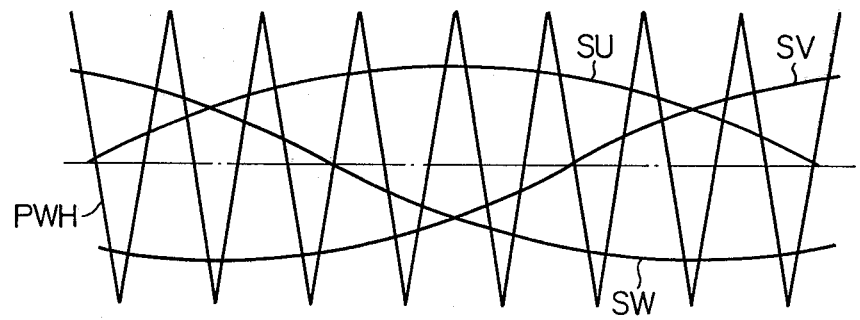
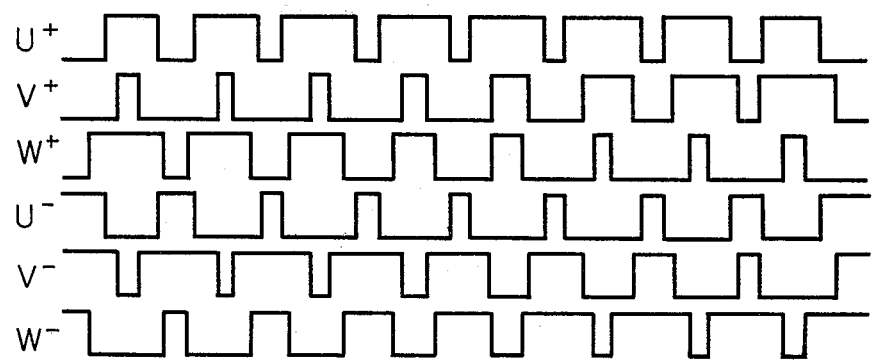

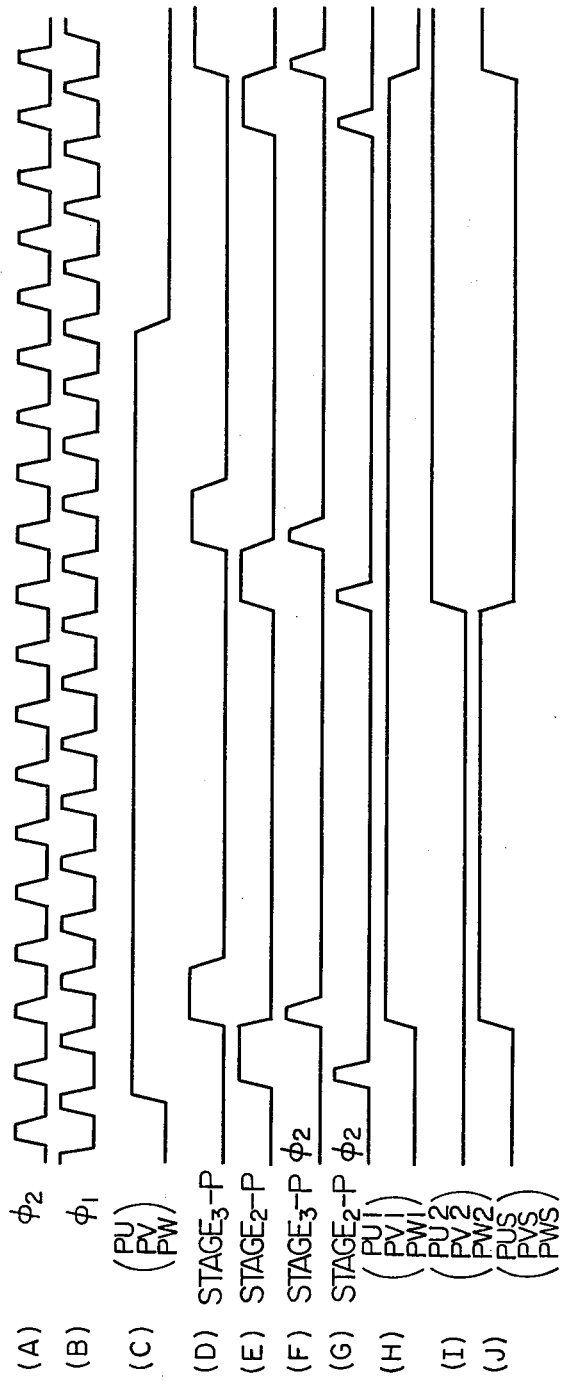
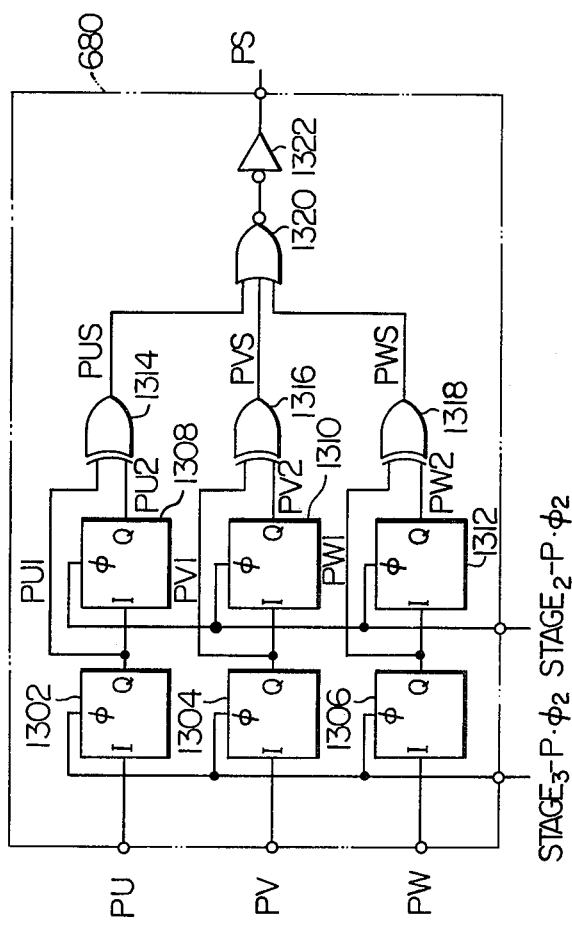
FIG. 14
FIG. 13

FIG. 15
570

| | | |
|---|---|---|
| PQ | REG. | 702 |
| PI | REG. | 704 |
| D1 | REG. | 706 |
| D2 | REG. | 708 |
| D3 | REG. | 710 |
| D4 | REG. | 712 |
| D5 | REG. | 714 |
| D6 | REG. | 716 |
| D7 | REG. | 718 |
| PN | REG. | 720 |
| PULSW | REG. | 722 |
| CHP | REG. | 724 |
| CHD | REG. | 726 |
| INTV | REG. | 728 |
| CMT | REG. | 730 |

FIG. 18

| | 602 | | 604 | |
|---|---|---|---|---|
| 754 | PQ FF | | PQ BF | 910 |
| 756 | PI FF | | PI BF | 912 |
| 758 | PN FF | | PN BF | 914 |
| 760 | UP FF | | UP BF | 916 |
| 762 | VP FF | | VP BF | 918 |
| 764 | WP FF | | WP BF | 920 |
| 766 | UN FF | | UN BF | 922 |
| 768 | VN FF | | VN BF | 924 |
| 770 | WN FF | | WN BF | 926 |
| 772 | PULSW FF | | PULSW BF | 928 |
| 774 | CHP FF | | CHP BF | 930 |
| 776 | CHD FF | | CHD BF | 932 |
| 778 | INTV FF | | INTV BF | 934 |
| 780 | PG FF | | PG BF | 936 |
| 782 | CMT FF | | CMT BF | 938 |

FIG. 16
572

| | | |
|---|---|---|
| PWMT | REG. | 732 |
| PNC | REG. | 734 |
| PULSWT | REG. | 736 |
| PGT(PULSC) | REG. | 738 |
| PGNC | REG. | 740 |
| CHT | REG. | 742 |
| INTVT | REG. | 744 |
| DGTLO | REG. | 546 |

FIG. 17
574

| | |
|---|---|
| PG REG.(PULS REG.) | 748 |
| PGN REG. | 750 |
| PN REG. | 752 |

APPARATUS FOR CONTROLLING AN ELECTRIC MOTOR

BACKGROUND OF THE INVENTION

This invention relates to control apparatus for electric motors and more particularly to a control apparatus for an inverter-driven electric motor, which digitally controls the motor by means of a digital computing circuit.

There has been an increasing demand for the speed adjustable electric motors as a means of increasing the functional efficiency of electric motors as well as equipment incorporating electric motors, and many different attempts have been made to ensure a greater control accuracy. Recently, microcomputer-controlled high-efficiency equipment has been made available, and also inverters incorporating high switching speed power devices have been made available. In addition, there has been a trend toward making the speed of electric motors variable by means of pulse width modulation or choppers and other control methods employing the pulse width modulation of the unequal pulse type. However, according to these known control methods there is provided in all cases a circuit for each of the controlled systems and consequently if a microcomputer is used, a variety of controls will be required for effecting an overall control of the electric motor. In the case of apparatus in which the motor controls are effected separately and the discrete control circuits provided for the individual controlled systems are simply combined together as mentioned previously, the systematic mutual actions among the controlled systems have not been brought into effect adequately, and it has been difficult to ensure a precise control. Another disadvantage is that the circuits become complicated undesirably.

SUMMARY OF THE INVENTION

It is the object of the present invention to provide a multifunction control apparatus for electric motors which may ensure, by means of a relatively simple circuitry, accurate speed control of an electric motor as well as the production of the output pulses required for controlling the electric motor in accordance with the operating conditions of the motor.

In accordance with the present invention, there is provided an apparatus for controlling an electric motor, which comprises detecting means for producing a plurality of detection signals indicative of the operating conditions of an electric motor, digital computing circuit means for digitally processing the detection signals to produce a plurality of digital control amounts, first storage means for storing the plurality of digital control amounts as a plurality of reference data, second storage means for storing a plurality of instantaneous data indicative of the instantaneous operating conditions of the motor, comparison circuit means for comparing the reference data with the corresponding instantaneous data in a time-divisional manner, third storage means for storing the plurality of comparison result data from the comparison circuit means in correspondence with the digital control amounts, stage signal generating means for supplying time-divisional comparison processing stage signals to the comparison circuit means and the first, second and third storage means in correspondence with the digital control amounts, means responsive to each stage signal for selecting one of the digital control amounts and selecting one of the comparison result data corresponding to the selected digital control amount, and means responsive to the selected comparison result data to produce signals for controlling the motor.

BRIEF DESCRIPTION OF THE DRAWINGS

FIG. 2 is a diagram for explaining the pulse width modulated waveforms of the phases in FIG. 1.

FIG. 4 is a diagram for explaining the pulse width modulated waves of the phases in FIG. 3.

FIG. 13 is a block diagram for the external pulse synchronizing circuit.

FIG. 14 is a time chart for the synchronizing circuit shown in FIG. 13.

FIG. 15 is a diagram showing a detailed arrangement of the reference register group.

FIG. 16 is a diagram showing a detailed arrangement of the instantaneous register group.

FIG. 17 is a diagram showing a detailed arrangement of the output register group.

FIG. 18 is a diagram showing a detailed arrangement of the first and second comparison output latch groups.

DESCRIPTION OF THE PREFERRED EMBODIMENTS

Figure 1:
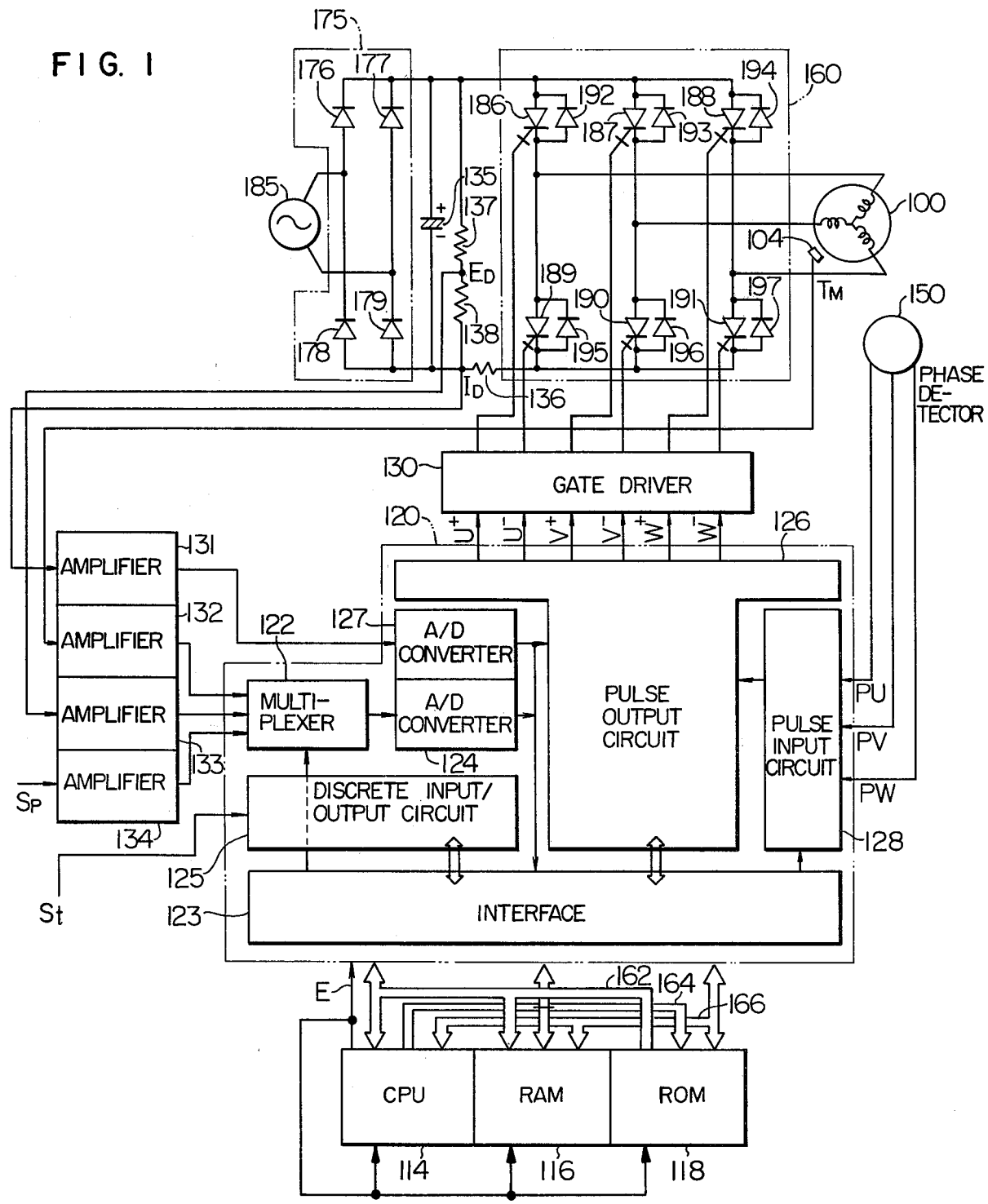
FIG. 1 is a circuit diagram showing the construction of an apparatus for controlling an electric motor (commutatorless electric motor) with a phase detector according to an embodiment of the present invention.

For better understanding of the present invention, the outline of the invention will be firstly described below.

In accordance with the invention, a first plurality of registers are provided in which the data indicative of the operating conditions of an electric motor is used as input data, subjected to computational operations and then stored in the corresponding registers according to the resulting contents. The registers not only store the data produced by the computational operations but they also store the data indicative of predetermined values. The data stored in the registers have a common characteristic in that the data is used as the reference values for the comparison operations to be performed. Thus, these registers will hereinafter be referred to as a reference register group and the data stored in the reference register group will hereinafter be referred to as reference data.

A second plurality of registers are provided to store the data indicative of the instantaneous operating conditions of the electric motor. These registers will hereinafter be referred to as an instantaneous register group. The data stored in the instantaneous registers will hereinafter be referred to as instantaneous data.

Thus, the apparatus of this invention comprises a reference register group, an instantaneous register group, an incrementer/decrementer (a circuit for increasing or decreasing the data by 1 or decreasing the data to zero), an incrementer/decrementer controller, a comparison circuit, a comparison result storage circuit, and a stage counter. With this circuit arrangement, the processes for the respective stages are performed in a predetermined sequence of time by the stage counter. To perform for each of the stages the task determined by it, the associated register is selected from the reference register group and the instantaneous register group, respectively, and the reference data and the instantaneous data are transferred from these registers to the comparison circuit. The result of the comparison is stored in the comparison result storage circuit.

Also at each stage of the operation, the instantaneous data stored in the instantaneous register associated with the stage is written in accordance with the instantaneous condition of the electric motor or the like. This writing operation is effected by means of the incrementer/decrementer and the incrementer/decrementer controller.

More specifically, in accordance with the generation of time signals indicative of the reference units of time or the phase angle signals indicative of the units of rotational angle of the motor shaft, the incrementer/decrementer controller determines whether for example the data indicative of the instantaneous time or the data indicative of the instantaneous rotational angle of the phase angle rotation is to be increased or decreased. In accordance with the result of this determination, the incrementer/decrementer physically increases or decreases the instantaneous data. In this way, the instantaneous data is replaced with a new value from instant to instant and the comparison operation is effected in accordance with the renewed data. This comparison results in the generation of a pulse output corresponding to the reference data.

The above-described arrangement makes it possible to accomplish the complicated controls with a relatively simple circuit arrangement. Since the irregularly applied pulse signals are synchronized and detected, the input signals can be accurately detected to allow the incrementer/decrementer to operate accurately.

Now referring to the drawings, an embodiment of the invention will be described in connection with an electric motor (commutatorless electric motor) with a phase detector. FIG. 1 illustrates the circuit arrangement of an apparatus for controlling the electric motor with a phase detector.

In the Figure, a microcomputer is comprised of a central processor unit 114 (hereinafter referred to as a CPU), a random-access memory 116 (hereinafter referred to as a RAM) and a read-only memory 118 (hereinafter referred to as a ROM).

An input/output circuit 120 comprises an interface circuit 123 between the other elements of the circuit 120 and the CPU 114, an analog-to-digital converter circuit 124 (hereinafter referred to as an A/D converter) with a multiplexer 122, an A/D converter 127 with no multiplexer, a pulse output circuit 126, a pulse input circuit 128 and a discrete input/output circuit 125. An electric motor 100 is controlled by a three-phase inverter 160 comprising six thyristors 186 to 191 and six flywheel diodes 192 to 197. The necessary DC supply power is supplied from a commercial AC power supply 185 through a rectifier circuit 175 comprising diodes 176 to 179 and a smoothing capacitor 135.

Mounted on the motor 100 is a phase detector 150 for detecting the winding phases U, V and W to generate phase detection signals PU, PV and PW. On the other hand, the pulse outputs U+, U−, V+, V−, W+ and W− generated from the input/output circuit 120 are applied to turn on and off the thyristors 186 to 191 by way of a gate driver 130. From the standpoint of circuit arrangement, the power devices used should preferably be comprised of self-turn-off thyristors such as gate turn-off thyristors.

The microcomputer and the interface 123 of the input/output circuit 120 are connected to each other by means of a data bus 162, an address bus 164 and a control bus 166. An enable signal E is applied from the CPU 114 to the input/output circuit 120 for establishing synchronism between the input/output circuit 120 and the microcomputer.

The applied analog inputs include the DC voltage $E_D$ derived from the point of connection of resistors 137 and 138, the DC current $I_D$ produced by a shunt resistor 136, the motor temperature $T_M$ from a temperature sensor 104 mounted on the motor 100 and a speed command $S_P$. An important one of these analog inputs is the DC current $I_D$. The DC current $I_D$ is supplied to the multiplexerless A/D converter 127 through an amplifier 131. The DC voltage $E_D$, the motor temperature $T_M$ and the speed command $S_P$ are respectively applied through amplifiers 132 to 134 and through the multiplexer 122 to the A/D converter 124. The multiplexer 122 selects and applies to the A/D converter 124 one of the analog inputs designated by the CPU 114. The associated address of each of the inputs is designated by the CPU 114 through the address bus 164 in accordance with the instruction program stored in the ROM 118 and the designated analog input is applied to the A/D converter 124. The thus converted digital value is stored in the register associated with the input and it is transferred through the data bus 162 to the CPU 114 as occasions demand.

The phase signals PU, PV and PW are applied from the phase detector 150 to the pulse input circuit 128 for synchronization with the enable signal E.

The data processed by the CPU 114 is taken into the interface 123 and then stored in the pulse output circuit 126. The outputs from the pulse output circuit 126 consist of signals having pulse widths corresponding to the signals introduced through the interface 123 and the outputs include the pulse width modulated signals U+, V+, W+, U−, V− and W−. These signals are outputted after the application of a start command to the discrete input/output circuit 125.

FIG. 2 is a diagram showing the timing of generation of the pulse width modulated signals U+, V+, W+, U−, V− and W− from the pulse output circuit 126, and the signal PWM is a carrier signal produced by the pulse output circuit 126 which is reset in response to the leading and trailing edges of the phase detection signals PU, PV and PW so that it increases and decreases with certain slopes and is compared with the data $D_1$ level from the CPU 114 so as to effect the modulation only during the latter 60 degrees of the 120° energization period. In the like manner, the data $D_2$ level from the CPU 114 decreases the pulse width only at the leading edges during the first 60 degrees to thereby generate the respective pulse width modulated signals U+, V+, W+, U−, V− and W−.

Figure 3:
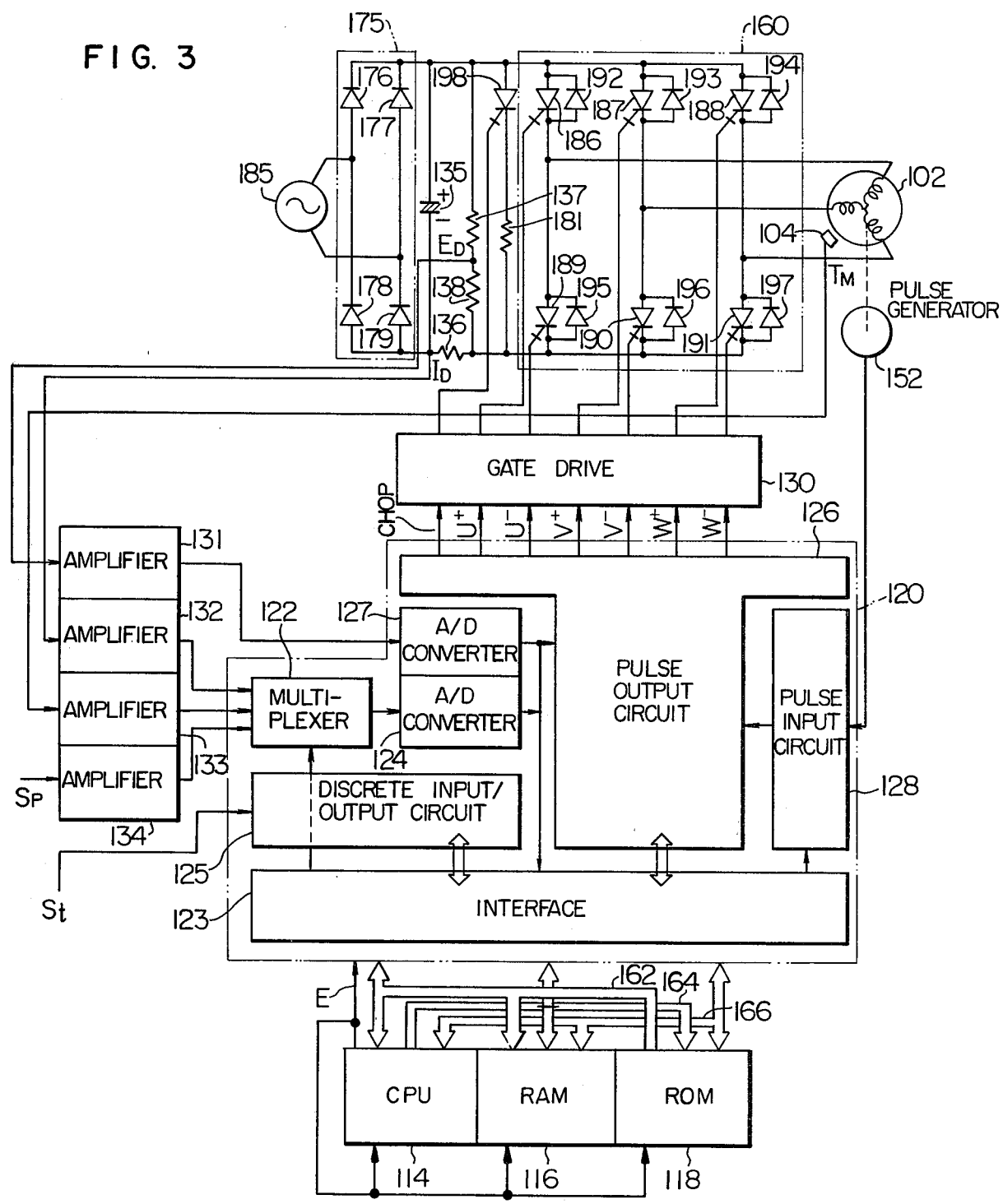
FIG. 3 is a circuit diagram showing the construction of an apparatus for controlling an electric motor (induction motor) with no phase detector.

FIG. 3 shows the circuit arrangement for an electric motor (induction motor) with no phase detector. FIG. 3 is substantially the same with FIG. 1 except that a pulse generator 152 is provided in place of the phase detector 150 of FIG. 1 and that a thyristor 198 and a resistor 181 are provided for the purpose of voltage control which is effected by chopping the thyristor 198. For this purpose, the chopper signal CHOP from the pulse output circuit 126 of the input/output circuit 120 is used.

FIG. 4 shows the timing of generation of the pulse width modulated signals U+, V+, W+, U−, V− and W− each consisting of 15 unequal pulses and the signals are produced by means of the carrier signal PWM and modulating waves SU, SV and SW.

Figure 5:
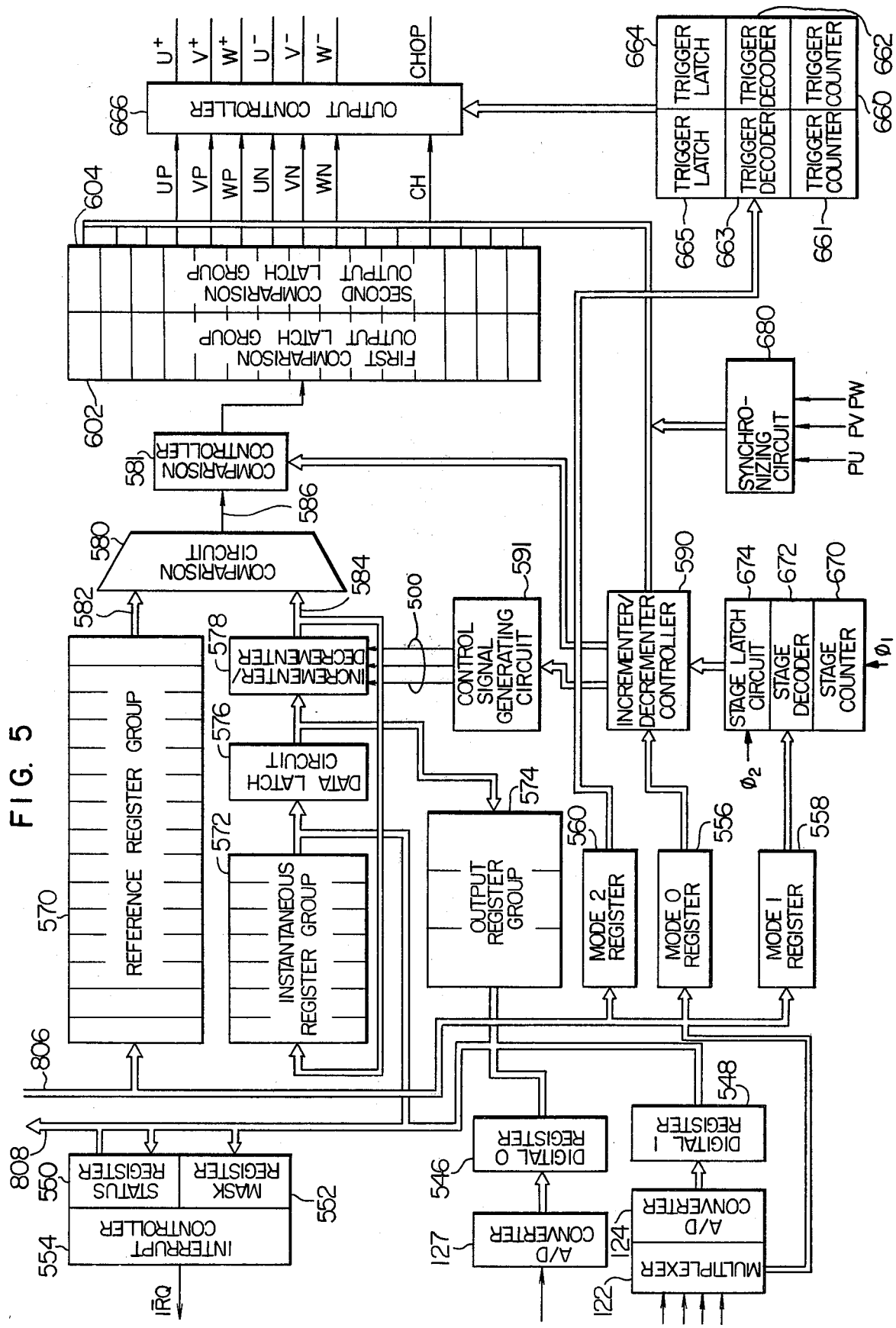
FIG. 5 is a detailed circuit diagram of the input/output circuit.
Figure 8:
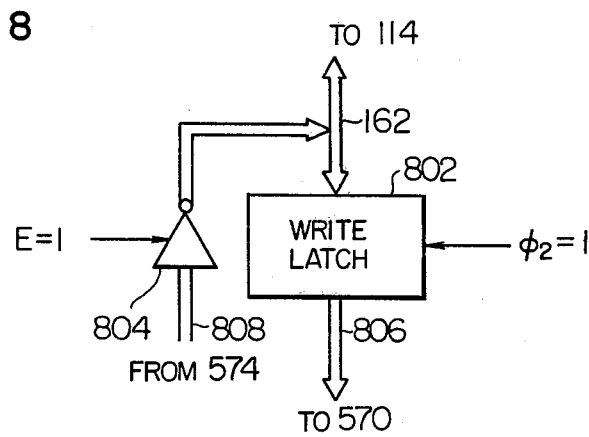
FIG. 8 is a block diagram for the data bus.

FIG. 5 shows a detailed circuit diagram of the pulse output circuit 126, in which a register group 570 is the previously mentioned reference register group for storing the data processed by the CPU 114 and the data indicative of predetermined values. This data is applied from the CPU 114 through the interface 123 which includes a data latch 802 and a write bus 806 as shown in FIG. 8. The addressing of the data storage registers of the reference register group 570 is effected in the interface 123 by an address decoder 906 shown in FIG. 9 through the address bus 164 and the data is applied and stored in the addressed register of the pulse output circuit 126.

A register group 572 is the instantaneous register group for storing the instantaneous conditions of the motor or the like. The instantaneous register group 572, a latch circuit 576 and an incrementer/decrementer 578 perform a so-called counter function.

An output register group 574 comprises for example a register for storing the rotational speed of the motor, a register for storing the input pulse period, etc. These values are obtained by reading in the values in the instantaneous registers when a certain condition is met. In response to the signals applied from the CPU 114 through the address bus 164 and the control bus 166, the corresponding register of the output register group 574 is selected so that the data stored in the selected register is transferred to the CPU 114 via the interface 123 through a read bus 808, as seen in FIG. 8.

A comparison circuit 580 performs a comparison operation by receiving through its input terminals 582 and 584 the reference data stored in the selected register of the reference register group 570 and the instantaneous data stored in the selected register of the instantaneous register group 572. The comparison result is delivered from its output terminal 586. The output is set into the associated latch of a first comparison output latch group 602 which serves as a comparison result storage circuit. The comparison result is then set into the associated latch of a second comparison output latch group 604.

The read and write operations of the reference register group 570, the instantaneous register group 572 and the output register group 574, the operations of the incrementer/decrementer 578 and the comparison circuit 580 and the operations of setting outputs into the first and second comparison output latch groups 602 and 604 are performed within a predetermined interval of time. The various processing operations are performed in a time-divisional manner in accordance with the sequence of a stage counter 670. In correspondence with each of the sequential states of the counter 670, the associated registers in the reference register group 570 and the instantaneous register group 572, the associated latch in the first comparison output latch group 602 and if necessary, the corresponding register of the output register group 574 are selected. The incrementer/decrementer 578 and the comparison circuit 580 are used in common by the respective registers of the reference register group 570 and the instantaneous register group 572.

Figure 6:
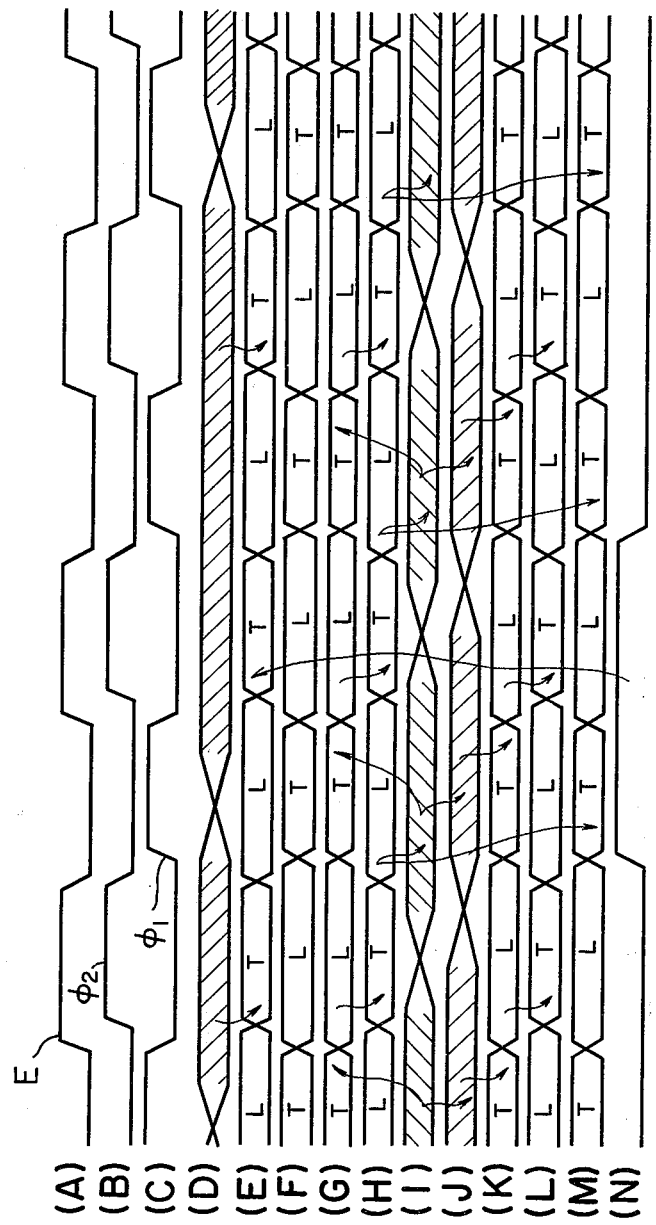
FIG. 6 is a time chart for the input/output circuit.
Figure 7:
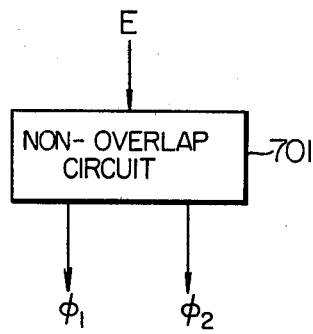
FIG. 7 is a circuit diagram for the non-overlap circuit.

FIG. 6 is a time chart for the circuit of FIG. 5. The enable signal E is applied to the input/output circuit 120 from the CPU 114. This signal is shown in (A) of FIG. 6. In response to the enable signal E, the non-overlap circuit 701 shown in FIG. 7 produces two-phase clock signals $\phi_1$ and $\phi_2$ which do not overlap each other. The signals are shown in (B) and (C) of FIG. 6. The circuit shown in FIG. 5 is operated in response to the clock signals $\phi_1$ and $\phi_2$.

Shown in (D) of FIG. 6 is the output signal of the stage counter 670 which counts in response to the leading edge of the clock signal $\phi_1$. However, due to the delay in the lead wires and the gates, the output signal of the stage counter 670 will be established in the hatched portion. From the output signal (D) of the stage counter 670, a stage decoder 672 produces a processing signal for each of the stages. However, the processing signal for each stage is delayed considerably with respect to the clock signal $\phi_1$ and this decreases the effective time for each processing. A stage latch 674 is provided to increase the effective time of the processing and the output signal of the stage latch 674 is shown in (E) of FIG. 6. In the following description of FIG. 5, symbol "T" indicates that the latch and register circuits are in the enabled state and their outputs are dependent on the inputs. Symbol "L" indicates that these circuits are storing some data and their outputs are not dependent on the inputs.

The stage counter 674 which is designed for $\phi_2 = 1$ stores the output signal of the stage decoder 672 so that the signal (E) becomes the stage signal and its stage is changed in response to the leading edge of the clock signal $\phi_2$. Thus the processing of each stage is effected in synchronism with the clock signal $\phi_2$. The stage signal shown in (E) serves as a read signal for the reference register group 570 and the instantaneous register group 572 so as to read the data stored in the selected registers. The waveforms shown in (F) and (G) of FIG. 6 show the operation of the reference register group 570 and the instantaneous register group 572. The read operation of the reference register group 570 and the instantaneous register group 572, respectively, is performed in response to the stage signal (E). The write operation is performed in synchronism with the clock signal $\phi_1$ by causing the reference register group 570 and the instantaneous register group 572 to go to "T" in response to $\phi_1=1$.

The operation of the data latch circuit 576 is shown by the waveform in (H) of FIG. 6. The circuit is designed so that it goes to "T" in response to the clock signal $\phi_2=1$ so as to write in the data of the selected register which is read out from the instantaneous register group 572, and the circuit goes to "L" in response to the clock signal $\phi_2=0$. In this way, the latch circuit 576 stores the data read out from the particular register of the instantaneous register group 572 which is associated with the stage in question. The data stored in the data latch circuit 576 is corrected in accordance with the respective conditions by the incrementer/decrementer 578 which is not synchronized with the clock signals.

The incrementer/decrementer 578 performs the following functions in response to the output signals 500 of a control signal generating circuit 591 under the control of the incrementer/decrementer controller 590. The first is an incrementer/decrementer function which increases or decreases the value of the input data by 1. The second function is a non-increment/non-decrement function to pass the input data without incrementing or decrementing it. The third function is a reset function for changing all the data to indicate a zero value.

The data flow for the individual registers in the instantaneous register group 572 is such that one of the registers in the instantaneous register group 572 is selected by the stage counter 672, so that its stored data is applied to the comparison circuit 580 by way of the data latch circuit 576 and the incrementer/decrementer 578. Simultaneously, a closed loop is established extending from the output of the incrementer/decrementer 578 to the original selected register. Thus, when the incrementer/decrementer 578 performs the function to increase or decrease the data by 1, the closed loop performs a function as a counter. However, if the data taken from the particular selected register of the instantaneous register group 572 is allowed to go round without limit, i.e., to cycle repeatedly, the counter function will be ruined and a malfunction will be caused. As a result, the data latch circuit 576 is provided to block the data. Since the data latch circuit 576 goes to "T" in response to the clock signal $\phi_2=1$ and since the "T" state allowing the writing of input data into the instantaneous registers occurs in response to the clock signal $\phi_1=1$, even if the data in the particular register of the instantaneous register group 572 changes, the output of the data latch circuit 576 will not be changed. This operation is illustrated by the waveform in (H) of FIG. 6. In other words, the data cutoff takes place in response to $\phi_2=0$. In addition, due to the delay in the wiring and gates, the output data I of the incrementer/decrementer 578, which is not synchronous with the clock signals, will be established as shown by the hatched portion.

In a like manner as the incrementer/decrementer 578, the comparison circuit 580 also operates out of synchronism with the clock signals. The comparison circuit 580 receives as its inputs the reference data in one of the reference registers selected by the stage signal (E) and the instantaneous data in one of the instantaneous registers selected by the stage signal (E) and transferred by way of the data latch circuit 576 and the incrementer/decrementer 578. The result of the comparison between the two data items is set into the particular latch selected by the stage signal (E) from those in the first comparison output latch group 602 which goes to "T" in response to the clock signal $\phi_1=1$. In this case, the comparison result output signal of the comparison circuit 580 becomes as shown in (J) of FIG. 6 and the signal is established as shown by the hatched portion. Then the output from the first comparison output latch group 602 is set into the second comparison output latch group 604 which goes to "T" in response to the clock signal $\phi_2=1$. The operation of the first and second comparison output latch groups 602 and 604 are illustrated by the waveforms in (K) and (L) of FIG. 6.

Further, the outputs of the second comparison output latch group 604 provide such output signals as motor inverter gate signals UP, VP, WP, UN, VN and WN and a chopper signal CH and the various conditions for the instantaneous register group 572 which provide the input signals to the incrementer/decrementer controller 590.

The output signals of the second comparison output latch group 604 are also used as transfer signals for writing the data from the instantaneous register group 572 into the output register group 574.

The operation of the output register group 574 is illustrated by the waveforms in (M) of FIG. 6. When the output register of the output register group 574 selected by the stage signal (E) goes to the "T" state in response to the clock signal $\phi_1=1$, the instantaneous data in the instantaneous register of the instantaneous register group 572 selected by the stage signal (E) is written into the selected output register and the output register goes to a "L" state in response to the clock signal $\phi_1=0$.

When the data stored in the output register group 574 is to be read by the CPU 114, the register is addressed from the CPU 114 through the read bus 808 and the data is fetched in synchronism with the enable signal E shown in (A) of FIG. 6.

Figure 9:
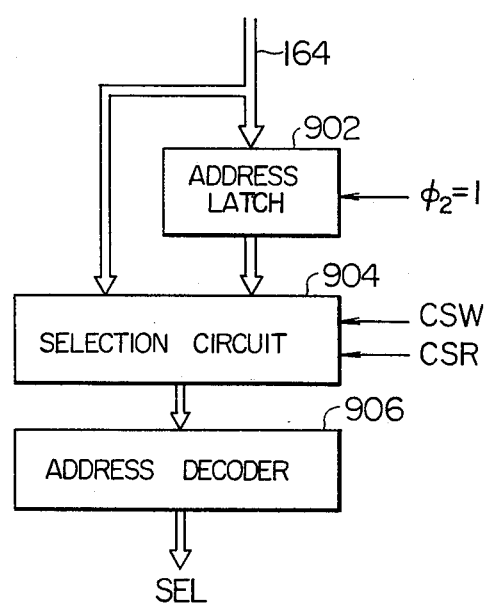
FIG. 9 is a block diagram for the address bus.

In the case of the interface between the input/output 120 and the CPU 114 (where the CPU 114 comprises for example the Hitachi HD 46800), according to the time chart of FIG. 6, the reference register group 570 into which the data is written from the CPU 114 differs in timing from the output register group 574 from which the data is read out to the CPU 114. FIGS. 8 and 9 show block diagrams for the data bus and the address bus. The write data 806 to be written from the CPU 114 is stored in a write latch 802 which goes to "T" in response to the clock signal $\phi_2=1$ and in response to $\phi_1=1$ the data is written into the reference register of the reference register group 570 which was selected by the address signal. On the other hand, the read data to be read out to the CPU 114 is transferred to the data bus 163 by means of the read bus 808 and a 3-state buffer circuit 804 adapted to be enabled in response to the enable signal E=1 of the CPU 114 and then the data is entered into the CPU 114.

The reference register group 570 and the output register group 574 are selected by the address signals from the CPU 114. As in the case of the data, the timing of a register select signal SEL is not the same for the reference register group 570 and the output register group 574. In the case of the reference register group 570, the address signal is stored in an address latch circuit 902 which goes to "T" in response to $\phi_2=1$ and then whether the write data or the read data is determined in accordance with a chip select write signal CSW or a chip select read signal CSR produced by the signal on the control bus so as to select the output signal of the address latch circuit 902 or the address signal on the address bus 164. In the case of the signal CSW the output signal of the address latch 902 is selected, while in the case of the signal CSR the address signal is selected, in a selection circuit 904. The selection of registers is effected by an address decoder 906 through the selection circuit 904.

On the other hand, since the inverter comprises the controlled rectifier elements as mentioned in connection with FIGS. 1 and 3, the magnitude of current in the elements will give rise to a difficulty or it will be necessary to limit the current. For this reason, the input/output circuit 120 includes the A/D converter 124 so as to convert the input analog quantity into a digital quantity. The other analog quantities required for the motor control include the DC voltage, speed command, etc. However, of the current, DC voltage, speed command, etc., of the rectifier elements the most important analog quantity is the current in the controlled rectifier elements. As a result, in FIG. 5 the input/output circuit 120 includes two A/D converters, i.e., the A/D converter 127 used solely for the rectifier current and the A/D converter 124 with the multiplexer 122. The data converted by the current A/D converter 127 into a digital quantity is then stored in a digital 0 register 546 and the data converted by the A/D converter 124 into a digital quantity is stored in a digital 1 register 548. However, there is not sufficient time for the CPU 114 to process the magnitude of the current value in the digital 0 register 546 and thus the processing is effected in the input/output circuit 120. More specifically, the processing is effected so as to decrease the voltage applied to the motor.

The digital data stored in the digital 0 register 546 representing the A/D converted digital current quantity is compared with the reference data of the reference register group 570 storing the data equivalent to a current limit value. However, the A/D converter 127 operates irrespective of the stage signal shown in (E) of FIG. 6. As a result, each process generates the stage signal (E) in a predetermined sequence and the stage signals include a process stage for current value comparing purposes. This is a sort of stage interruption function. The stage interruption function is requested by an A/D conversion end signal produced by the leading edge of the clock signal $\phi_2$ as shown in (N) of FIG. 6. In this case, the stage latch 674 does not store the output signal of the stage decoder 672 but stores the A/D conversion end signal (N), and the current value digital data in the digital 0 register 546 is compared with the reference data in the reference register group 570 storing the current limit value so as to determine whether the rectifier current has reached the current limit value. In that case, the stage counter 670 performs no counting and in response to the completion of the stage interruption or the next $\phi_2=1$ the output signal of the stage decoder 672 is stored in the stage latch 674. When this occurs, the process stage which was interrupted by the interruption process is performed and the succeeding processes are successively performed in the predetermined sequence.

On the other hand, the digital data produced by the multiplexer-equipped A/D converter 124 has no stage interruption function and they are taken into the CPU 114 as a read data. The digital data produced by the current A/D converter 127 is also taken into the CPU 114.

The input/output circuit 120 includes a status register 550 for applying an interrupt request signal to the CPU 114 and a mask register 552 for masking the interrupt request signal from the status register 550. The status register 550 stores the internal statuses of the electric motor and the input/output circuit 120. Its stored contents are shown in the following Table 1.

TABLE 1

| Bit | Contents |
|---|---|
| Bit 0 | Motor phase angle pulse |
| Bit 3 | Reaching rectifier current limit value |
| Bit 4 | External all-elements cutoff signal |
| Bit 5 | Reaching reference time determined by input/output circuit 120 |
| Bit 6 | Conversion end signal for A/D converter 124 with multiplexer |
| Bit 7 | Conversion end signal for current A/D converter 127 |

Figure 10:
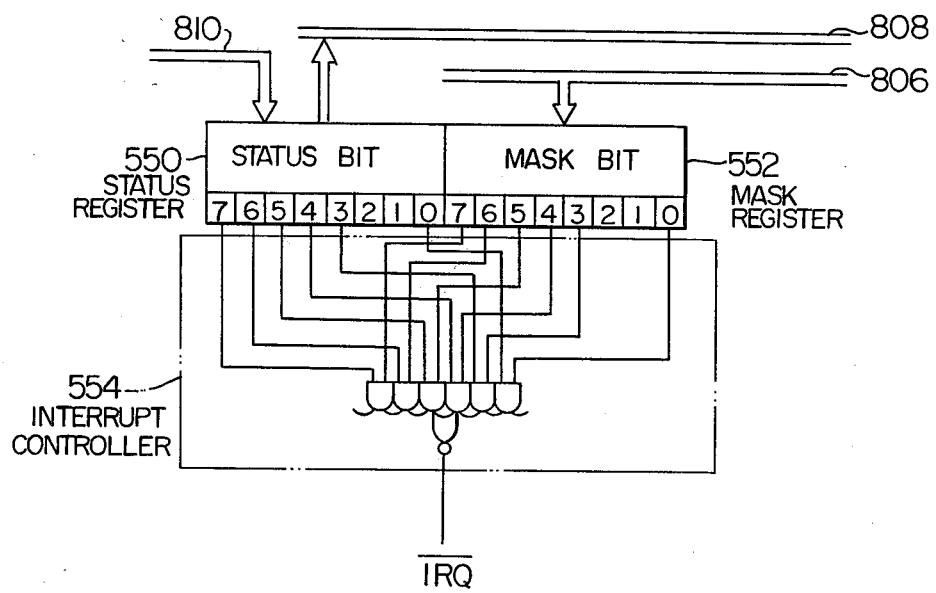
FIG. 10 is a diagram for explaining the status register and the mask register.

FIG. 10 illustrates the status register 550, the mask register 552 and an interrupt controller 554.

The status register 550 forms a read register of the CPU 114 so as to allow the analysis of the cause of the interruption. On the other hand, the mask register 552 forms a write register to allow the addressing from the CPU 114. The AND, OR or NOT operation is performed on the output signals of the status register 550 and the mask register 552 in accordance with the bits involved and the resulting output forms an interrupt request signal IRQ. Numeral 810 designates a signal indicative of an interruption source.

The registers for selecting the mode of operation of the input/output circuit 120 from the CPU 114 include a mode 0 register 556, a mode 1 register 558 and a mode 2 register 560. Their contents are shown in the following Table 2.

TABLE 2

| Register | | Contents |
|---|---|---|
| Mode 0 register | Bit 0 | Start/stop of input/output circuit 120 |
| | $M_0$ | 0: stop, 1: start |
| | Bit 1 | All-controlled elements turn-off |
| | $M_1$ | 0: normal, 1: turn-off |
| | Bit 2 | Selection between PULS process and PG process |
| | $M_2$ | 0: PG process, 1: PULS process |
| | Bit 3 | Stage interrupt masking on completion of A/D conversion |
| | $M_3$ | 0: masking, 1: no masking |
| | Bit 4 | Equal pulses or unequal pulses? |
| | $M_4$ | 0: equal pulses, 1: unequal pulses |
| | Bit 6 | Is phase detector used? |
| | $M_6$ | 0: none, 1: used |
| | Bit 7 | Is motor rotation forward or reverse? |
| | $M_7$ | 0: forward, 1: reverse |
| Mode 1 register | | Determines stage processing time interval |

TABLE 2-continued

| Register | Contents |
| --- | --- |
| Mode 2 register | Determines time for output controller 666 |

Each of the mode 0 register 556, the mode 1 register 558 and the mode 2 register 560 serves as a write register for the purpose of dictating the mode from the CPU 114.

The control signal generating circuit 591 generates a count signal, increment/decrement signal and reset signal so as to control through the incrementer/decrementer controller 590 the functions of the incrementer/decrementer 578 including the increment/decrement function, non-increment/non-decrement function and resetting function.

A comparison controller 581 is provided to control the comparison results ($\geq$, $\leq$, $=$) of the comparison circuit 580.

An output controller 666 performs the controls required for the maximum ON-period, minimum OFF-period and prevention of P-side arm and N-side arm lags of the power devices so as to protect and compensate the power devices.

Trigger counters 660 and 661 are counters for determining the time intervals required for protecting and compensating purposes, and trigger decoders 662 and 663 determine the time intervals required for protecting and compensating purposes. Trigger latches 664 and 665 produce trigger pulses.

Figure 11:
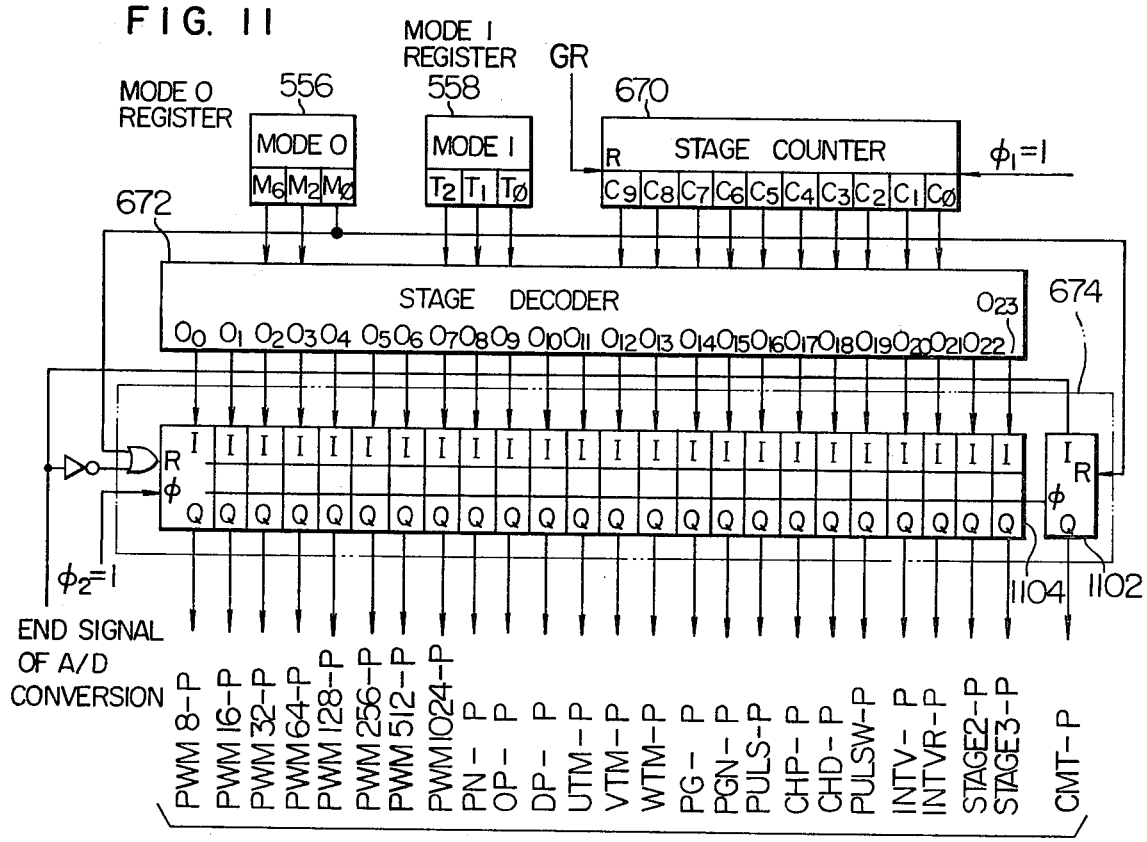
FIG. 11 is a circuit diagram for the stage signal generating circuit.

FIG. 11 shows the circuits for generating the stage signals (E). In response to the "1" level of the clock signal $\phi_1$ from the non-overlap circuit 701 in FIG. 7, the stage counter 670 starts counting and the stage decoder 672 receives as its inputs the outputs $C_0$ to $C_9$ of the stage counter 670 and the bit 2-$M_2$ and bit 6-$M_6$ signals of the mode 0 register 556 and the bit 0-$T_0$, bit 1-$T_1$ and bit 2-$T_2$ signals of the mode 1 register 558 shown in FIG. 5. The stage decoder 672 generates signals $0_0$ to $0_{23}$. The output signals $0_0$ to $0_{23}$ are applied to the stage latch circuit 674 so that the stage latch circuit 674 goes to "T" in response to the clock signal $\phi_2 = 1$ and latches the output $0_0$ to $0_{23}$ of the stage decoder 672.

On the other hand, the bit 0-$M_0$ signal from the mode 0 register 556 of FIG. 5 is applied to the reset input R of the stage latch circuit 674 so that if $M_0=0$, all the outputs of the stage latch circuit 674 go to "0" (a low level) and all the processing operations are stopped. If the bit 0-$M_0$ signal of the mode 0 register 556 goes to "1", the stage signals are generated in a predetermined sequence and the processes are performed correspondingly.

The stage decoder 672 may be easily provided by means of a read-only memory and it is possible to use a microprogrammed one. The stage interruption function is performed by a latch 1102 of the stage latch circuit 674 which generates a signal CMT-P. Firstly, all the latches of the stage latch circuit 674 except the latch 1102, that is, the stages of the latch group 1104, are reset by A/D conversion end signal to stop all the operations other than the interrupt operation. The A/D conversion end signal shown in (N) of FIG. 6 is stored in the latch 1102 and the interrupt operation is performed.

The detailed operations performed by the outputs of the stage latch circuit 674 representing the stage signals are shown in the following Table 3.

TABLE 3

| Stage signal | Processing operation |
| --- | --- |
| PWMX-P | This operation is to produce a carrier wave, and in dependence on the value of the mode 1 register x can be changed to intervals of 8 $\mu$s, 16 $\mu$s, 32 $\mu$s, 64 $\mu$s, 128 $\mu$s, 256 $\mu$s, 512 $\mu$s or 1024 $\mu$s. |
| PN-P | This operation is to determine the number of PWM pulses. |
| OP-P | This operation is to determine by the carrier wave the signal pulse width for the eletric motor, when the bit 6-$M_6$ of the mode 0 register is "0" (if a phase detector is used). |
| DP-P | This operation is to determine timewise width of pulses to the motor by means of the carrier wave when $M_6 = 0$ (if a phase detector is used). |
| UTM-P | This operation is to determine by the carrier wave the pulses for the phase U of the motor when the bit 6-$M_6$ of the mode 0 register is "1" (if no phase detector is used). |
| VTM-P | This operation is to determine by the carrier wave the pulses for the phase V of the motor when $M_6 = 1$ (if there is no phase detector). |
| WTM-P | This operation is to determine by the carrier wave the pulse for the phase W of the motor when $M_6 = 1$ (if there is no phase detector). |
| PG-P | This operation is to measure timewise the width of the external pulse when the mode 0 register bit 2-$M_2 = 0$. |
| PGN-P | This operation is to count the number of occurrences of an overflow condition in the timer processed by PG-P. This operation is performed when $M_2 = 0$. |
| PULS-P | This operation is to count the number of pulses occurring at given time intervals when the mode 0 register bit 2-$M_2 = 1$. |
| CHP-P | This operation is to determine the period of the chopper output. |
| CHD-P | This operation is to determine the duty cycle of the chopper output. |
| PULSW-P | This operation is to determine timewise the width for the PULS-P. |
| INTV-P | This operation is to generate a timer which is an interrupt request signal to the CPU 114. |
| INTVR-P | This operation is to reset the timer used for INTV-P. |
| STAGE2-P STAGE3-P | The signals required for the external pulse synchronization purposes. |
| CMT-P | This operation is the stage interrupt operation for current comparison purposes. |

Table 4 shows the relationship between the stage signals and the outputs of the stage counter 670 and the registers 556 and 558.

TABLE 4

| | Stage counter | | | | | | | | | | Mode 1 | | | Mode 0 | |
| --- | --- | --- | --- | --- | --- | --- | --- | --- | --- | --- | --- | --- | --- | --- | --- |
| Stage signal | $C_9$ | $C_8$ | $C_7$ | $C_6$ | $C_5$ | $C_4$ | $C_3$ | $C_2$ | $C_1$ | $C_0$ | $T_2$ | $T_1$ | $T_0$ | $M_3$ | $M_2$ |
| PWM8-P | x | x | x | x | x | x | x | 0 | 0 | 0 | 0 | 0 | 0 | x | x |
| PWM16-P | x | x | x | x | x | x | 0 | 0 | 0 | 0 | 0 | 0 | 1 | x | x |
| PWM32-P | x | x | x | x | x | 0 | 0 | 0 | 0 | 0 | 0 | 1 | 0 | x | x |
| PWM64-P | x | x | x | x | 0 | 0 | 0 | 0 | 0 | 0 | 0 | 1 | 1 | x | x |
| PWM128-P | x | x | x | 0 | 0 | 0 | 0 | 0 | 0 | 0 | 1 | 0 | 0 | x | x |
| PWM256-P | x | x | 0 | 0 | 0 | 0 | 0 | 0 | 0 | 0 | 1 | 0 | 1 | x | x |

TABLE 4-continued

| Stage signal | Stage counter | | | | | | | | | | Mode 1 | | | Mode 0 | |
|---|---|---|---|---|---|---|---|---|---|---|---|---|---|---|---|
| | $C_9$ | $C_8$ | $C_7$ | $C_6$ | $C_5$ | $C_4$ | $C_3$ | $C_2$ | $C_1$ | $C_0$ | $T_2$ | $T_1$ | $T_0$ | $M_3$ | $M_2$ |
| PWM512-P | x | 0 | 0 | 0 | 0 | 0 | 0 | 0 | 0 | 0 | 1 | 1 | 0 | x | x |
| PWM1024-P | 0 | 0 | 0 | 0 | 0 | 0 | 0 | 0 | 0 | 0 | 1 | 1 | 1 | x | x |
| PN-P | x | x | x | x | x | x | x | 0 | 0 | 1 | x | x | x | x | x |
| OP-P | x | x | x | x | x | x | x | 0 | 1 | 1 | x | x | x | 0 | x |
| DP-P | x | x | x | x | x | x | x | 1 | 0 | 0 | x | x | x | 0 | x |
| UTM-P | x | x | x | x | x | x | x | 0 | 1 | 1 | x | x | x | 1 | x |
| VTM-P | x | x | x | x | x | x | x | 1 | 0 | 0 | x | x | x | 1 | x |
| WTM-P | x | x | x | x | x | x | x | 1 | 0 | 1 | x | x | x | 1 | x |
| PG-P | x | x | x | x | x | x | x | 1 | 1 | 0 | x | x | x | x | 0 |
| PGN-P | x | x | x | x | x | x | x | 1 | 1 | 1 | x | x | x | x | 0 |
| PULS-P | x | x | x | x | x | x | x | 1 | 1 | 0 | x | x | x | x | 1 |
| CHP-P | x | x | x | x | x | 0 | 0 | 0 | 1 | 0 | x | x | x | x | x |
| CHD-P | x | x | x | x | x | 1 | 0 | 0 | 1 | 0 | x | x | x | x | x |
| PULSW-P | x | x | x | 0 | 0 | 0 | 1 | 0 | 1 | 0 | x | x | x | x | x |
| INTV-P | 1 | 1 | 0 | 1 | 1 | 1 | 1 | 0 | 1 | 0 | x | x | x | x | x |
| INTVR-P | 1 | 1 | 1 | 1 | 1 | 1 | 1 | 0 | 1 | 0 | x | x | x | x | x |
| STAGE2-P | x | x | x | x | x | x | x | 0 | 1 | 0 | x | x | x | x | x |
| STAGE3-P | x | x | x | x | x | x | x | 0 | 1 | 1 | x | x | x | x | x |
| CMT-P | A/D conversion end signal | | | | | | | | | | | | | | |

Initially, a general reset signal GR is applied to the reset terminal of the stage counter 670. This causes all the counter outputs $C_1$ to $C_9$ to go to "0". The general reset signal GR is applied from the CPU 114 when this control circuit is to be started. In this condition, the outputs $C_0$ to $C_3$ of the stage counter 670 are "0" so that if a clock signal $\phi_2$ is applied when the bit 0-$T_0$, bit 1-$T_1$ and bit 2-$T_2$ signals of the mode 1 register 558 are all "0", a stage signal PWM8-P is generated at the leading edge of the clock signal $\phi_2$. This stage signal initiates the PWM8-P operation. The stage counter 670 increases its count by 1 in response to the next clock signal $\phi_1=1$, and the leading edge of the next clock signal $\phi_2$ generates the next stage signal PN-P which initiates the PN operation. Thus, if the counter 670 continues to count in response to every $\phi_1=1$, a stage signal is generated at the leading edge of every clock signal $\phi_2$ and each stage signal initiates the associated operation.

When the outputs $C_0$ to $C_2$ of the stage counter 670 all go to "1", a stage signal PGN-P is generated (if only the mode 0 register $M_2=0$) so that the PGN operation is performed and all the operations in Table 4 are completed. The outputs $C_0$ to $C_9$ of the stage counter 670 all go to "0" in response to the next clock signal $\phi_1=1$ so that if the outputs of the mode 1 register 558 are "0s", a stage signal PWM8-P is generated at the next clock signal $\phi_2=1$ and the PWM operation is performed. In this way, the operations of Table 4 are performed repeatedly.

Figure 12:
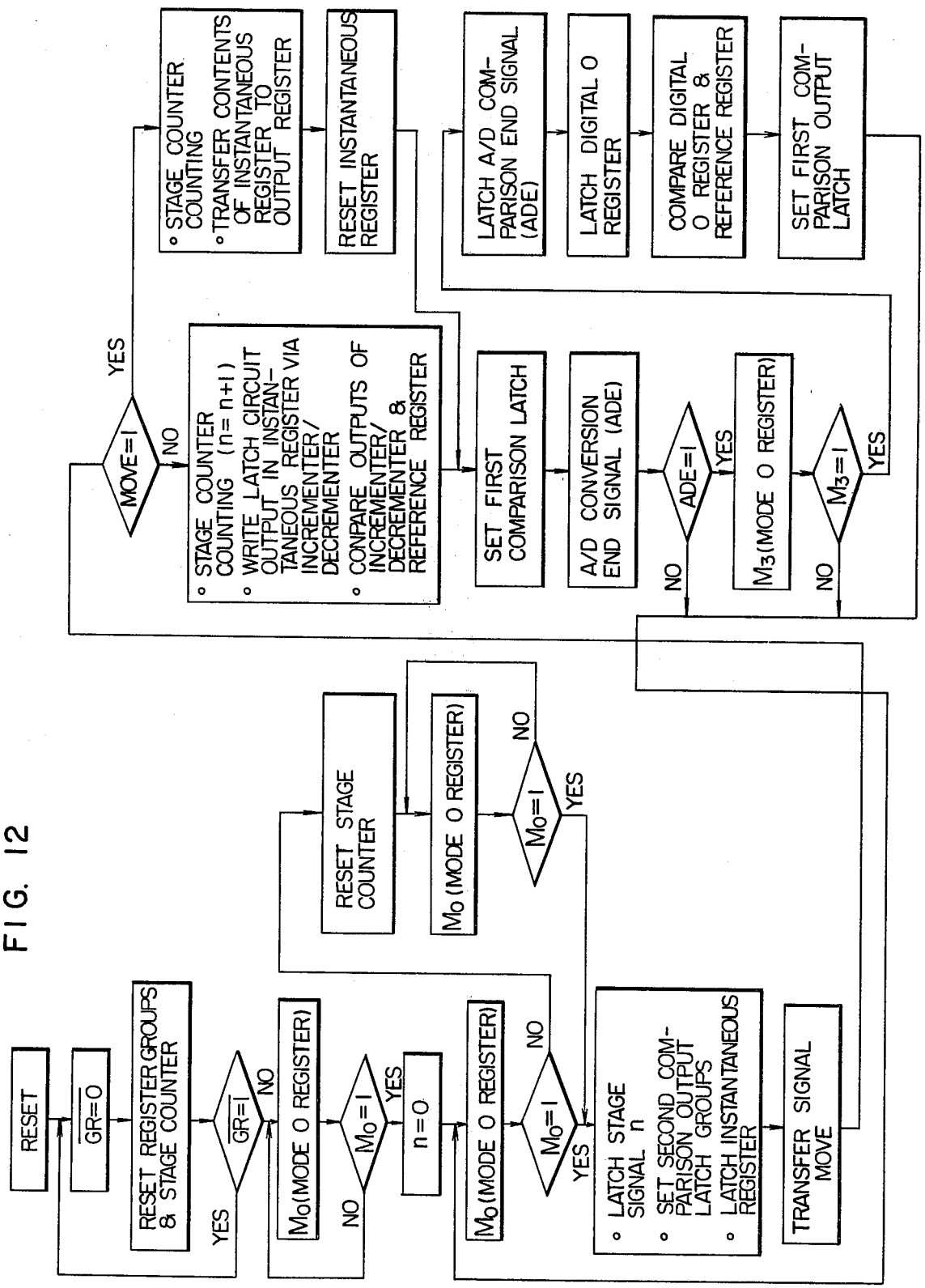
FIG. 12 is a system flowchart for the input/output circuit.

Now referring to FIG. 12, there is illustrated a system flow of the input/output circuit 120.

When the general reset signal GR=0, the register groups and the stage counter 670 all go to "0". When the general reset signal GR goes to 1, it is first determined whether the bit 0 of the mode 0 register 556 or the signal $M_0$ for determining the start or stop of the input/output circuit 120 is "1" or not. If $M_0=0$, the input/output circuit 120 is held at reset until the signal $M_0$ goes to 1. When it becomes $M_0=1$, a stage signal corresponding to the 0 output of the stage counter 670 or the (n=0)th stage signal is generated. The actual execution of the operations starts at this point. Firstly, when $M_0=1$, the n-th stage signal is stored in the stage latch circuit 674 and simultaneously the following operations are performed.

(i) The output signals of the first comparison output latch group 602 are transferred to the second comparison output latch group 604.

(ii) The content of the instantaneous register selected from the instantaneous register group 572 by the stage signal is stored in the latch circuit 576.

Then, whether a transfer signal MOVE is "0" or "1" is determined. If MOVE=0, the stage counter 670 counts (n=n+1) and the output of the latch circuit 576 is passed to the incrementer/decrementer 578 whose output is written into the selected instantaneous register and simultaneously compared with the data in the reference register selected from the reference register group 570 by the stage signal. The result of the comparison is set into the first comparison output latch selected from the first comparison output latch group 602 by the stage signal. Then, the determination of the A/D conversion end signal is effected. If the transfer signal MOVE=1, the stage counter 670 counts and simultaneously the content of the instantaneous register is transferred to the output register selected from the output register group 574 by the stage signal and all the instantaneous registers are set to "0".

Depending on the determination of whether the A/D conversion end signal ADE is "0" or "1", a stage interruption request is made. If the signal ADE=0 the control is returned to the initial step to repeat the succeeding steps. If ADE=1, it is determined whether the bit 3-$M_3$ of the mode 0 register 556 or the stage interrupt mask bit is "0" or "1". If $M_3=0$, the control is returned to the initial step to repeat the succeeding steps. If $M_3=1$, a stage interrupt process is performed. For this purpose, the A/D conversion end signal ADE is stored in the stage latch 674 and a stage signal CMT-P is generated. Thus, the content of the digital 0 register 546 is compared with the content of the reference register in the reference register group 570 which is associated with the current and the comparison result is set into the first comparison output latch of the first comparison output latch group 602 which is associated with the current.

In FIG. 12, the upper right flow shows the steps performed when the mode 0 register 556 has $M_0=0$. In that case, the operation of the input/output circuit 120 is stopped and it is placed in a wait state until a start command which causes $M_0=1$ is received.

FIG. 13 shows the circuit arrangement of a synchronizing circuit for the operation associated with the external pulse signals PU, PV and PW, and FIG. 14 shows a time chart for the circuit.

By using the outputs STAGE3-P and STAGE2-P of the stage latch circuit 674 show in FIG. 11, the synchronism is established between the enable signal E and the external pulse signals PU, PV and PW in (C) of FIG. 14 to produce the synchronized signals.

The external pulse signals PU, PV and PW from the motor phase detector or the like are respectively latched in latch circuit 1302, 1304 and 1306 of FIG. 13 by a signal produced by combining the STAGE3-P signal of FIG. 11 and the clock signal $\phi_2$ as shown in (F) of FIG. 14.

In FIG. 14, (A) shows the clock signal $\phi_2$, (B) the clock signal $\phi_1$, (C) the external pulse signals PU, PV and PW, and (D) and (E) the stage signals STAGE3-P and STAGE2-P. As described in connection with FIG. 11, these stage signals are generated in synchronism with $\phi_2 = 1$. The external pulse signals (C) and the stage signals (D) and (E) are not related in time with each other.

Assuming now that the external pulse signals (C) are applied to the latch circuits 1302, 1304 and 1306 as shown in FIG. 14, the signals are latched by the ANDed signal STAGE3-P·$\phi_2$ of the stage signal STAGE3-P and the clock signal $\phi_2$. As a result, the latch circuits 1302, 1304 and 1306 generate respectively output signals PU1, PV1 and PW1 as shown in (H) of FIG. 14. The ANDed signal STAGE2-P·$\phi_2$ of the stage signal STAGE2-P and the clock signal $\phi_2$ latches the signals PU1, PV1 and PW1 in latch circuits 1308, 1310 and 1312 which in turn generate output signals PU2, PV2 and PW2 as shown in (I) of FIG. 14.

Exclusive OR circuits 1314, 1316 and 1318 respectively receive the signals PU1, PU2, the signals PV1, PV2 and the signals PW1, PW2 and generate signals PUS, PVS and PWS detecting the leading and trailing edges of the external pulse signals PU, PV and PW and having a time width corresponding to the time interval between the stage signals STAGE3-2 and STAGE2-P as shown in (J) of FIG. 14. With the synchronizing circuit 680 of FIG. 13, the leading and trailing edges of the external pulse signals can be detected in terms of a fixed pulse width in time and this pulse width is determined by the time difference between the stage signals STAGE3-P and STAGE2-P. Thus, by changing the stage signals applied respectively to the latch circuits 1302, 1304, 1306, and 1308, 1310, 1312, it is possible to adjust and vary the pulse width.

This pulse width is determined in relation with the allocation of the stage signals in Table 4. In other words, it is arranged so that in addition to the stage signal STAGE2-P which requires no external pulse signal from the processing point of view, the external pulse edge detection signal (J) is established. This detection signal (J) is used as a control signal for the incrementer/decrementer controller 590. The external pulse signals PU, PV and PW applied to the synchronizing circuit 680 shown in FIG. 13 are assumed to be in the form of 180-degree pulses having a 180-degree phase difference with respect to each other, and the outputs of the exclusive OR circuits 1314, 1316 and 1318 are applied to a 3-input OR circuit 1320 thereby producing a 60-degree pulse. In addition, instead of the three inputs, the output of the pulse generator 152 may be applied to any one of the external pulse signals PU, PV and PW of the synchronizing circuit 680 as shown in FIG. 3 so as to detect the rotational speed of the motor 102.

On the other hand, in order that the external pulse signals from the phase detector or the like may be positively synchronized to ensure the production of synchronized pulses PUS, PVS and PWS, the outputs from the phase detector must have a pulse width of over 8 $\mu$s. (In the present embodiment, the enable signal E from the CPU 114 has a pulse width of 1 $\mu$s and the stage signals PG-P and PULS-P in Table 4 are generated at intervals of 8 $\mu$s.)

If, for example, the phase detector is replaced with a pulse generator adapted to apply 500 pulses per revolution to the synchronizing circuit 680, the pulse width of 8 $\mu$s will be attained at the rotational speed of 7500 rpm. In order to follow up or respond to a higher speed, it is necessary to decrease the pulse width of 8 $\mu$s.

The following Table 5 shows the detailed functions of the reference register group 570 which receives the input data from the electric motor or the like and stores the reference data corresponding to the pulse outputs computed in the CPU 114. Its detailed construction is illustrated in FIG. 15.

TABLE 5

| Register No. | Function of register |
|---|---|
| 702 (P0 REG.) | Stores data indicative of the lower limit of the carrier wave for PWM process. |
| 704 (P1 REG.) | Stores data indicative of the upper limit of the carrier wave for the PWM process. The frequency of the carrier wave for the PWM process is determined by this data along with the data in the P0 register. |
| 706–718 (D1–D7 REG.) | Store data indicative of the half cycle of the modulated wave. These seven data represent the modulated wave. The seven data can produce a PWM signal consisting of a maximum of 15 unequal pulses. |
| 720 (PN REG.) | Stores data indicative of the number of unequal pulses. Basically, the number of pulses is 15, 9 or 3. (The data is represented by 5 for 15 pulses, 3 for 9 pulses and 1 for 3 pulses.) |
| 722 (PULSW REG.) | Stores data indicative of a predetermined time interval used for detecting the motor speed. |
| 724 (CHP REG.) | Stores data indicative of the chopper period for controlling the ratio of the ON period. |
| 726 (CHD REG.) | Stores data indicative of the chopper pulse width for controlling the ratio of the ON period. The duty cycle is controlled by this data along with the data in the CHP register. |
| 728 (INTV REG.) | Stores data indicative of a time interval to be measured as a timer. When this data is set, it becomes ready for example to generate an interrupt signal at the expiration of the time interval. |
| 730 (CMT REG.) | Stores data indicative of the current limit value. The voltages of the PWM signal and the chopper signal are controlled according to this data. |

The following Table 6 shows the detailed functions of the instantaneous register group 572 which stores the instantaneous conditions of the electric motor or the like and serves a counter function. Its detailed construction is shown in FIG. 16.

TABLE 6

| Register No. | Function of register |
|---|---|
| 732 (PWMT REG.) | Generates a carrier signal for the PWM process. Stores an instantaneous value |

TABLE 6-continued

| Register No. | Function of register |
|---|---|
| | which increases at every expiration of a predetermined time, such as, selected one of predetermined time intervals of 8, 16, 32, 64, 128, 256, 512 and 1024 μs. The selection of the predetermined time interval is effected in response to the mode 1 register. |
| 734 (PNC REG.) | Counts the outputs of PO BF 910 in the second comparison output latch group which are inputs for counting the number of pulses of the PWM signal and stores an instantaneous value which increases in response to each output pulse of PO BF. Controls the number of unequal pulse in PWM. |
| 736 (PULSWT REG.) | Stores an instantaneous value which increases each time a predetermined time elapses after the generation of an output pulse from PULSW BF 928 in the second comparison output latch group. The time interval for detecting the motor speed. |
| 738 (PGT REG.) | Stores an instantaneous value which increases each time a predetermined time interval elapses after the generation of an external pulse PS. |
| (PULSC REG.) | Stores an instantaneous value which increases each time an external pulse signal PS is generated after the generation of an output pulse of PULSW BF 928 in the second comparison output latch group. |
| 740 (PGNC REG.) | Stores an instantaneous value which increases each time an output is generated from PG BF 936 of the second comparison output latch indicating an overflow condition of the data in PGT REG of the instantaneous register group after the generation of an external pulse signal PS. |
| 742 (CHT REG.) | Stores an instantaneous value which increases each time a predetermined time interval elapses after the generation of an output pulse from CHP BF 930 in the second comparison output latch group. |
| 744 (INTVT REG.) | Stores an instantaneous value which increases each time a predetermined time interval elapses after the generation of an output pulse from INTV BF 934 of the second comparison output latch group. |
| 546 (DGTLO REG.) | Stores the digital data produced by the current A/D converter. |

The following Table 7 shows the detailed functions of the output register group 574 for storing the measured data. Its detailed construction is shown in FIG. 17.

TABLE 7

| Register No. | Function of register |
|---|---|
| 748 (PG REG.) | Stores the data from PGT REG 738 of the instantaneous register group after the generation of an output pulse or external pulse signal PS. The data is delivered onto the data bus by the address bus and control bus commands from the CPU 114. |
| (PULS REG.) | Stores the data from PULSC REG 738 of the instantaneous register group after the generation of an output pulse from PULSW BF 928 of the second comparison output latch group. The data is delivered onto the data bus by the address bus and control bus commands from CPU 114. |
| 750 (PGN REG.) | Stores the data from PGNC REG 740 of the instantaneous register group after the generation of an output pulse or external pulse signal PS. The data is |

TABLE 7-continued

| Register No. | Function of register |
|---|---|
| | delivered onto the data bus by the address bus and control bus commands from CPU 114. |
| 752 (CPN REG.) | Stores the data from PNC REG 734 of the instantaneous register group after the generation of an output pulse from PO BF 910 of the second comparison output latch group. The data is delivered onto the data bus by the address bus and control bus commands from CPU 114. |

The following Table 8 shows the detailed functions of the first and second comparison output latch groups 602 and 604 for storing the comparison outputs of the comparison circuit 580, and its detailed construction is shown in FIG. 18.

TABLE 8

| Latch No. | Function of latch |
|---|---|
| 754 (PO FF) | "1" is latched on condition that the data in PO REG 702 of the reference register group is greater than or equal to the data in PWMT REG. 732 of the instantaneous register group. |
| 756 (P1 FF) | "1" is latched on condition that the data is P1 REG 704 of the reference register group is less than or equal to the data in PWMT REG 732 of the instantaneous register group. |
| 758 (PN FF) | "1" is latched on condition that the data in PN REG 720 of the reference register group is less than or equal to the data in PNC REG 734 of the instantaneous register group. |
| 772 (PULSW FF) | "1" is latched on condition that the data in PULSW REG 722 of the reference register group is less than or equal to the data in PULSWT REG 736 of the instantaneous register group. |
| 774 (CHP FF) | "1" is latched on condition that the data in CHP REG 724 of the reference register group is less than or equal to the data in CHT REG 740 of the instantaneous register group. |
| 776 (CHD FF) | "1" is latched on condition that the data in CHD REG 726 of the reference register group is less than or equal to the data on CHT REG 740 of the instantaneous register group. |
| 778 (INTV FF) | "1" is latched on condition that the data in INTV REG 728 of the reference register group is less than or equal to the data in INTVT REG 742 of the instantaneous register group. |
| 780 (PG FF) | "1" is latched on condition that the data (usually "0") in PO REG 720 of the reference register group is greater than or equal to the data in PGT REG 738 of the instantaneous register group. |
| 782 (CMT FF) | "1" is latched on condition that the data in CMT REG 730 of the reference register group is less than or equal to the A/D converted data in DGTLO REG 546. |
| 910 (PO BF) | The output of PO FF 754 of the first comparison output latch group is latched at clock signal $\phi_2 = 1$. |
| 912 (P1 BF) | The output of P1 FF 756 of the first comparison output latch group is latched at clock signal $\phi_2 = 1$. |
| 914 (PN BF) | The output of PN FF 758 of the first comparison output latch group is latched at clock signal $\phi_2 = 1$. |
| 916 (UP BF) | The output of UP FF 760 of the first comparison output latch group is latched at clock signal $\phi_2 = 1$. |
| 918 (VP BF) | The output of VP FF 762 in the first comparison output latch group is latched |

TABLE 8-continued

| Latch No. | Function of latch |
|---|---|
| | at clock signal $\phi_2 = 1$. |
| 920 (WP BF) | The output of WP FF 764 in the first comparison output latch group is latched at clock signal $\phi_2 = 1$. |
| 922 (UN BF) | The output of UN FF 766 in the first comparison output latch group is latched at clock signal $\phi_2 = 1$. |
| 924 (VN BF) | The output of VN FF 768 in the first comparison output latch group is latched at clock signal $\phi_2 = 1$. |
| 926 (WN BF) | The output of WN FF 770 in the first comparison output latch group is latched at clock signal $\phi_2 = 1$. |
| 928 (PULSW BF) | The output of PULSW FF 772 in the first comparison output latch group is latched at clock signal $\phi_2 = 1$. |
| 930 (CHP BF) | The output of CHP FF 774 in the first comparison output latch group latched at clock signal $\phi_2 = 1$. |
| 932 (CHD BF) | The output of CHD FF 776 in the first comparison output latch group is latched at clock signal $\phi_2 = 1$. |
| 934 (INTV BF) | The output of INTV FF 778 in the first comparison output latch group is latched at clock signal $\phi_2 = 1$. |
| 936 (PG BF) | The output of PG FF 780 in the first comparison output latch group is latched at clock signal $\phi_2 = 1$. |
| 938 (CMT BF) | The output of CMT FF 782 in the first comparison output latch group is latched at clock signal $\phi_2 = 1$. |

Figure 19:
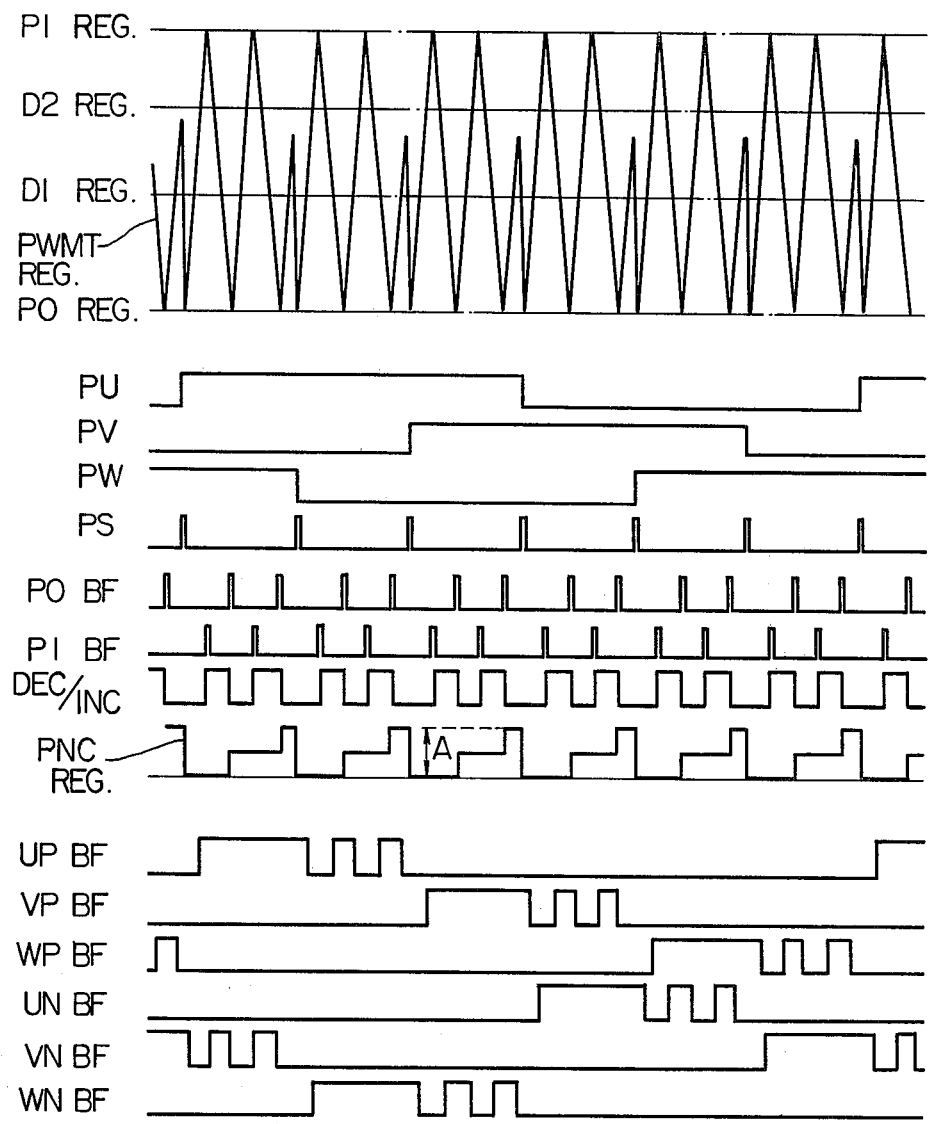
FIG. 19 is a time chart for explaining the production of the pulse width modulated signals of FIG. 2.

FIG. 19 is a diagram for explaining the production of the pulse width modulated signals which are the gate signals for the inverter of the electric motor (commutatorless electric motor) with phase detector shown in FIG. 1.

The carrier wave PWM for the pulse width modulated signals is produced by the stage signal PWM-P process. The carrier wave is produced by the PWMT REG 732 of the instantaneous register group 572 and the P0 REG 702 and P1 REG 704 of the reference register group 570. During the stage signal PWM-P process, the PWMT REG 732 is unconditionally incremented or decremented by the incrementer/decrementer 578. On the other hand, the output signals PU, PV and PW of the phase detector 150 are applied as external pulse signals to the input/output circuit 120 so that when the resulting synchronized external pulse signal PS indicative of the leading and trailing edges of the external pulse signals goes to "1", the PWMT REG 732 is reset.

The increment/decrement operation is controlled by means of the P0 BF 910 and P1 BF 912 of the second comparison output latch group 604. When the output DEC/INC of a flip-flop (not shown) which is reset at P0 BF=1 and set at P1 BF=1 goes to "0", the PWMT REG 732 is incremented, and the PWMT REG 732 is decremented when the output DEC/INC goes to "1".

When decremented, the PWMT REG 732 is compared with the P0 REG 702 so that when a condition is met that the stored data of the P0 REG 702 is not less than that of the PWMT REG 732, a "1" is latched in the P0 FF 754 of the first comparison output latch group 602. Also the P0 BF 910 of the second comparison output latch group 604 latches the output of the P0 FF 754 and thus the output of the P0 BF 910 goes to 1.

When incremented, the PWMT REG 732 is compared with the P1 REG 704 so that when a condition is satisfied that the stored data of the P1 REG 704 is not more than that of the PWMT REG 732, a "1" is latched in the P1 FF 756 of the first comparison output latch group 602. Also the P1 BF 912 of the second comparison output latch group 604 latches the output of the P1 FF 756 and the output of the P1 BF 912 goes to "1". As will be seen from FIG. 19, the stored data of the PWMT REG 732 varies with the lapse of time.

The PN-P process for counting the number of pulses of the pulse width modulated signal is performed as follows. When the output of the P0 BF 910 goes to "1", the PNC REG 734 of the instantaneous register group 572 is incremented, and when the synchronized external pulse signal PS goes to "1", the stored data of the PNC REG 734 is transferred and written into the CPN REG 752 of the output register group 574 (at A in FIG. 19) and the PNC REG 734 is reset. Thus, the CPU 114 is allowed to read the number of pulses.

In performing the stage signal OP-P process, the PWMT REG 732 is unconditionally not incremented and compared with the D2 REG 708 of the reference register group 570. Thus, if a condition is satisfied that the stored data of the D2 REG 708 is not more than that of the PWMT REG 732, the UP FF 760, VP FF 762, WP FF 764, UN FF 766, VN FF 768 and WN FF 770 of the first comparison output latch group 602 are selected by the selection circuit of FIG. 20 and a "1" is latched in the selected first comparison output latch group 602. Also the outputs of the UP FF 760, VP FF 762, WP FF 764, UN FF 766, VN FF 768 and WN FF 770 are respectively latched in the UP BF 916, VP BF 918, WP BF 920, UN BF 922, VN BF 924 and WN BF 926 of the second comparison output latch group 604.

Figure 20:
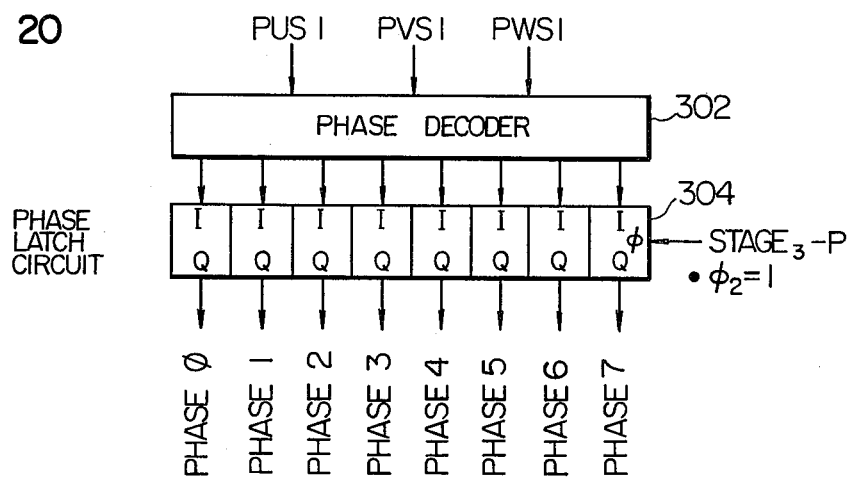
FIG. 20 is a circuit diagram of a selector circuit for the first comparison output latch group shown in FIG. 19.

In performing the stage signal DP-P process, the PWMT REG 732 is unconditionally not incremented and is compared with the D1 REG 706 of the reference register group 570 so that if a condition is satisfied that the stored data of the D1 REG 706 is not less than that of the PWMT REG 732, the UP FF 760, VP FF 762, WP FF 764, UN FF 766, VN FF 768 and WN FF 770 are selected by the selection circuit of FIG. 20 and a "1" is latched in the selected first comparison output latch group 602. The UP BF 916, VP BF 918, WP BF 920, UN BF 922, VN BF 924 and the WN BF 926 of the second comparison output latch group 604 respectively latch the output of the UP FF 760, VP FF 762, WP FF 764, UN FF 766, VN FF 768 and WN FF 770, respectively.

The output signals of the UN BF 916, VP BF 918, WP BF 920, UN BF 922, VN BF 924 and WN BF 926 form the pulse width modulated signals for the respective arms.

FIG. 20 shows the selection circuit whereby the latches of the first comparison output latch group 602 which are required for the stage signal OP-P and DP-P processes are selected by means of the synchronized signals PU1, PV1 and PW1 of the phase detection signals shown in FIG. 13. The following Table 9 shows the selection list of the first comparison output latch group 602 in accordance with the phase modes of the signals PU1, PV1 and PW1.

TABLE 9

| | Phase | | | First comparison output latch | |
|---|---|---|---|---|---|
| Phase signal | PUS1 | PVS1 | PWS1 | OP - P | DP - P |
| PHASE1 | 1 | 0 | 1 | UN FF | VN FF |
| PHASE2 | 1 | 0 | 0 | WN FF | UP FF |
| PHASE3 | 1 | 1 | 0 | VP FF | WN FF |
| PHASE4 | 0 | 1 | 0 | UN FF | VP FF |

TABLE 9-continued

| Phase signal | Phase | | | First comparison output latch |  |
|---|---|---|---|---|---|
|  | PUS1 | PVS1 | PWS1 | OP - P | DP - P |
| PHASE5 | 0 | 1 | 1 | WP FF | UN FF |
| PHASE6 | 0 | 0 | 1 | VN FF | WP FF |
| PHASE0 | 0 | 0 | 0 | suppressed | |
| PHASE7 | 1 | 1 | 1 | suppressed | |

In FIG. 20, the signals PU1, PV1 and PW1 produced by latching the external pulse signals or the phase detection signals at STAGE3-P·φ$_2$=1 are received as inputs and the phase signals shown in Table 9 or PHASE0, PHASE1, PHASE2, PHASE3, PHASE4, PHASE5, PHASE6 and PHASE7 are generated by means of a phase decoder 302 and a phase latch circuit 304. The latches to be selected from the first comparison output latch group are selected for the OP-P and DP-P processes, respectively, in accordance with the phase signals as shown in Table 9. The phase signals PHASE0 and PHASE7 represent faulty conditions of the phase detector 150 which are unlikely to occur. If the PHASE0 or PHASE7 condition occurs, all the arms are cut off for protection. The circuit of FIG. 20 has a function of diagnosing the phase detector 150 for fault. In addition, when the PHASE0 or PHASE7 condition occurs, a "1" is written in the bit 4-S$_4$ of the status register 550 and an interrupt request signal $\overline{IRQ}$ is applied to the CPU 114, making it possible to protect the power devices.

Figure 21:
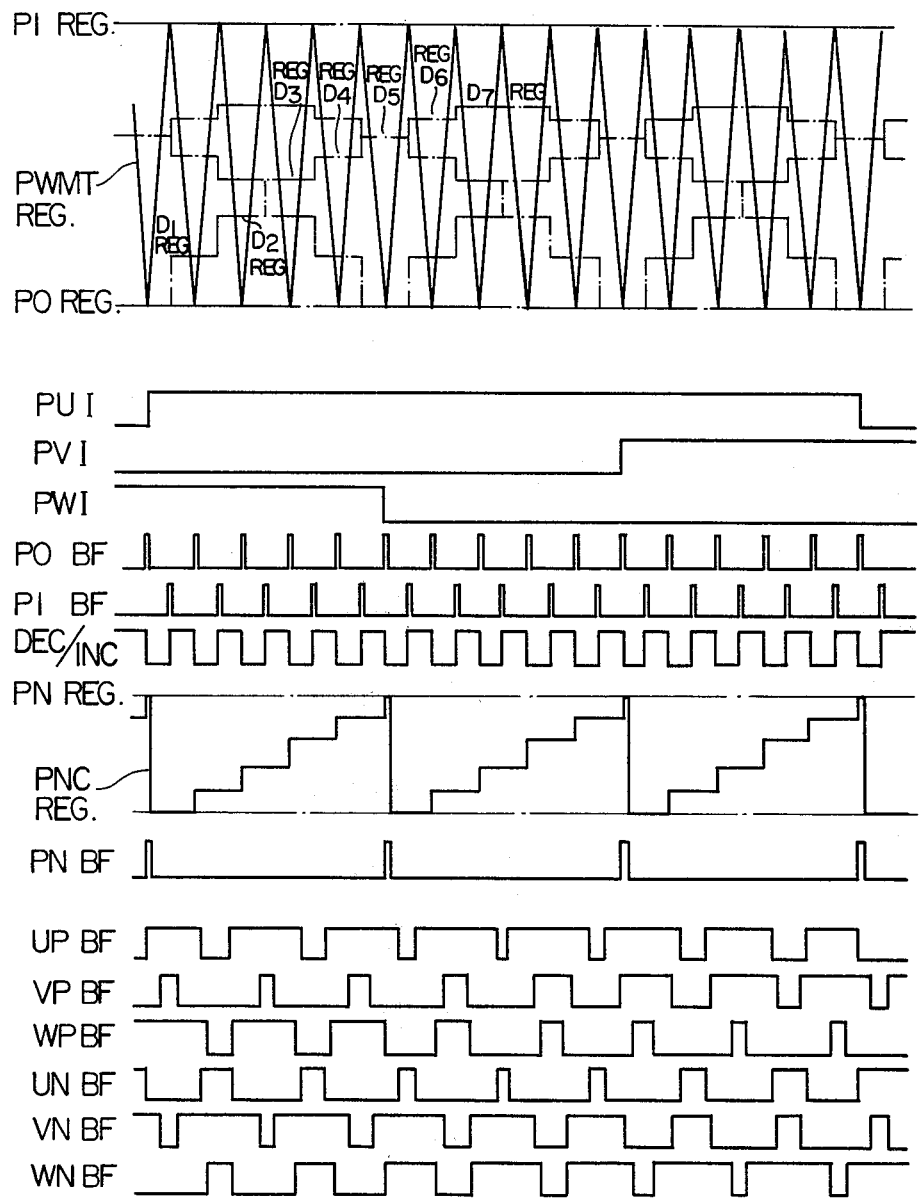
FIG. 21 is a time chart for explaining the production of the unequal pulse type pulse width modulated signals shown in FIG. 4.

FIG. 21 is a time chart useful for explaining the generation of pulse width modulated signal PWM or unequal pulse inverter gate signals for the electric motor (induction motor) with no phase detector shown in FIG. 3.

The carrier wave PWM for pulse width modulated signals is produced by the stage signal PWM-P process. The carrier wave PWM is produced by the PWMT REG 732 of the instantaneous register group 570 and the P0 REG 702 and P1 REG 704 of the reference register group 570. When the stage signal PWM-P process is performed, the PWMT REG 732 is unconditionally incremented or decremented by the incrementer/decrementer 578. The increment/decrement operation is controlled by means of the P0 BF 910 and P1 BF 912 of the second comparison output latch group 604. When the output DEC/INC of the flip-flop (not shown) which is reset at P0 BF=1 and set at P1 BF=1 goes to "0", the PWMT REG 732 is incremented, and it is decremented when the output DEC/INC goes to "1".

When decremented, the PWMT REG 732 is compared with the P0 REG 702 so that if a condition is satisfied that the stored data of the P0 REG 702 is not less than that of the PWMT REG 732, a "1" is latched in the P0 FF 754 of the first comparison output latch group 602. In addition, the P0 BF 910 of the second comparison output latch group 604 latches the output of the P0 FF 754 and the output of the P0 BF 910 goes to "1".

When incremented, the PWMT REG 732 is compared with the P1 REG 704 so that if a condition is satisfied that the stored data of the P1 REG 704 is not more than that of the PWMT REG 732, a "1" is latched in the P1 FF 756 of the first comparison output latch group 602. In addition, the P1 BF 912 latches the output of the P1 FF 756 and the output of the P1 BF 912 goes to "1". As will be seen from FIG. 21, the data stored in the PWMT REG 732 varies with the lapse of time.

Next, where the bit 4-M$_4$ of the mode 0 register 556 has a "1", the number of unequal pulses is controlled in the following manner.

In performing the PN-P process for counting the number of pulses of the pulse width modulated signals, when the P0 BF 910 goes to "1", the PNC REG 734 of the instantaneous register group 572 is incremented and is compared with the PN REG 720 of the reference register group 570, so that if a condition is satisfied that the stored data of the PN REG 720 is not more than that of the PNC REG 734, a "1" is latched in the PN FF 758 of the first comparison output latch group 602. In addition, the PN BF 912 of the second comparison output latch group 604 latches the output of the PN FF 758 and the output of the PN BF 912 goes to "1". Also the PNC REG 734 is reset when the output of PN BF 912 goes to "1". Thus, the PN BF 912 controls the number of pulses.

Figure 22:
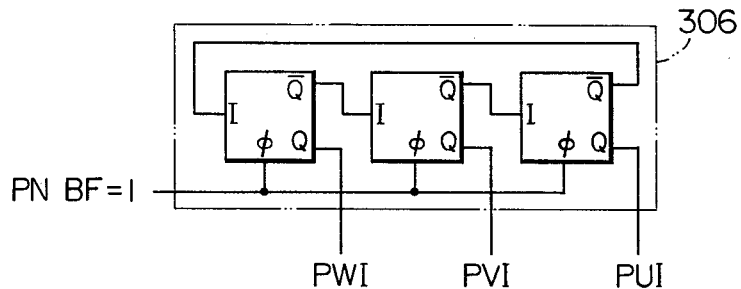
FIG. 22 is a circuit diagram of a phase generating circuit.

FIG. 22 shows the construction of a phase generating circuit for generating the signals PUI, PVI and PWI corresponding to the phase detection signals PU, PV and PW from the phase detector 150. The phase generating circuit 306 comprises a 3-stage shift register so that the stored data is shifted one stage at each PN BF=1, and the following Table 10 shows its shifted states. There are 6 phase modes including PHASE1, PHASE2, PHASE3, PHASE4, PHASE5 and PHASE6.

TABLE 10

| Phase mode | Phase | | |
|---|---|---|---|
|  | PUI | PVI | PWI |
| PHASE1 | 1 | 0 | 1 |
| PHASE2 | 1 | 0 | 0 |
| PHASE3 | 1 | 1 | 0 |
| PHASE4 | 0 | 1 | 0 |
| PHASE5 | 0 | 1 | 1 |
| PHASE6 | 0 | 0 | 1 |

The pulse width modulated signals of unequal pulses for the respective arms are produced by the stage signal UTM-P, VTM-P and WTM-P processes. In the case of the UTM-P process, the PWMT REG 732 is unconditionally not incremented and its stored data is compared with the data stored in the registers of the reference register group 570 which are associated with the modulated waves and selected by a reference register latch 312 of the selection circuit shown in FIG. 23 (i.e., the registers D1 REG 706, D2 REG 708, D3 REG 710, D4 REG 712, D5 REG 714, D6 REG 716 and D7 REG 718). Thus, the comparison result or the comparison output selected by a comparison result selection latch 310 of FIG. 23 (i.e., the reference register ≦ instantaneous register, reference register ≧ instantaneous register or phase signal) is latched in the UP FF 760 of the first comparison output latch group 602 and simultaneously the inverted signal of the comparison output is latched in the UN FF 766 of the first comparison output latch group 602. In addition, the outputs of the UP FF 760 and UN FF 766 are respectively latched in the UP BF 916 and UN BF 922 of the second comparison output latch group 604. The stage signal VTM-P and WTM-P processes are performed in the like manner.

Figure 23:
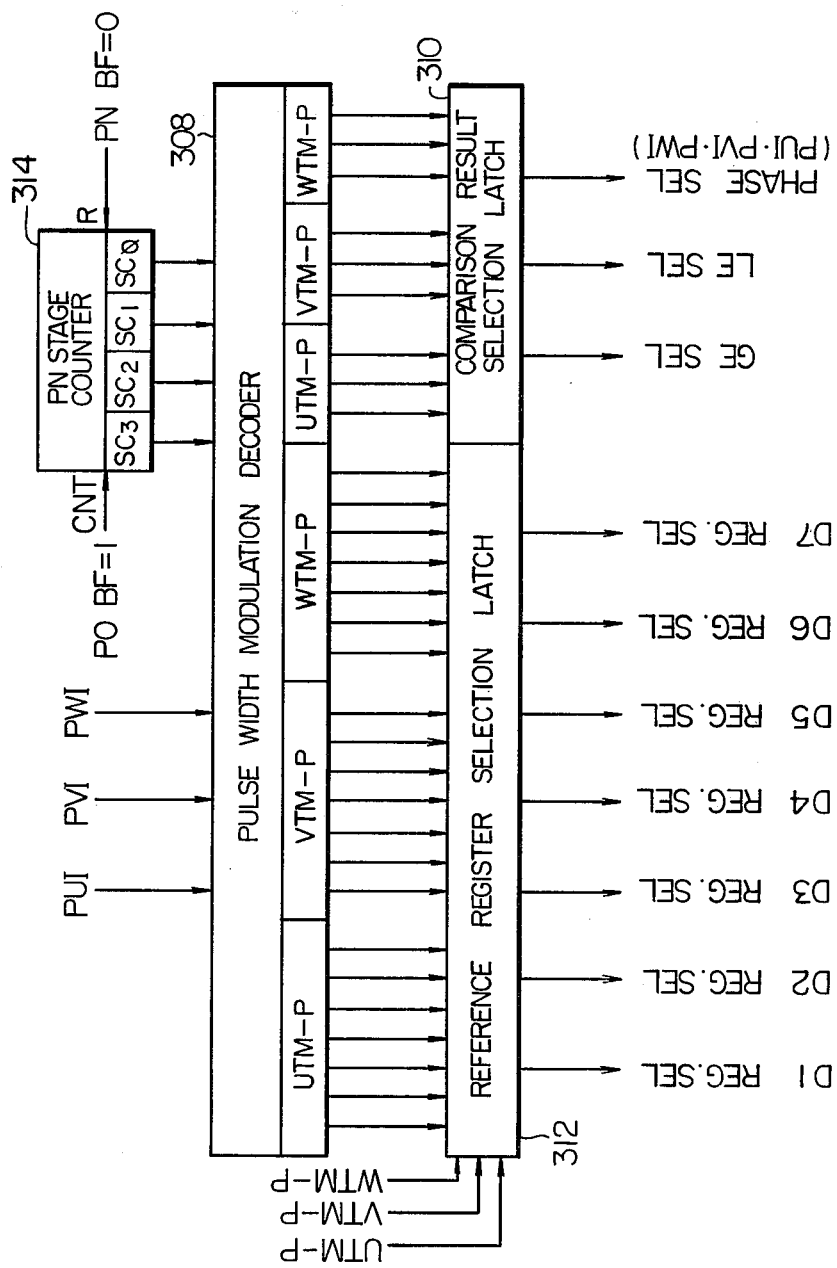
FIG. 23 is a circuit diagram of a pulse width modulation control circuit.

FIG. 23 shows this pulse width modulation control circuit. A PN stage counter 314 counts when the output of the P0 BF 910 goes to "1" and it is reset when the output of the PN BF 914 goes to "1". The outputs SC$_0$, SC$_1$, SC$_2$ and SC$_3$ of the PN stage counter 314 and the phase signals PUI, PVI and PWI are applied to a pulse width modulation decoder 308 which in turn performs the selection of the reference registers in the reference register group 570 and the selection of the comparison results. The reference register selection latch 312 and the comparison result selection latch 310 are latched by the stage signals UTM-P, VTM-P and WTM-P, thus generating the reference register selection signals D1 REG SEL, D2 REG SEL, D3 REG SEL, D4 REG SEL, D5 REG SEL, D6 REG SEL and D7 REG SEL, and the comparison result selection signal GE SEL (the reference register stored data $\leq$ the instantaneous register stored data), LE SEL (the reference register stored data $\geq$ the instantaneous register stored data) and PHASE SEL (phase signal) shown in Table 11.

TABLE 11
(part 1)

| Phase | | | PN stage | | | | Comparison circuit | | | Reference register | | |
|---|---|---|---|---|---|---|---|---|---|---|---|---|
| PUI | PVI | PWI | SC3 | SC2 | SC1 | SC0 | UTM | VTM | WTM | UTM | VTM | WTM |
| 1 | 0 | 1 | 0 | 0 | 0 | 0 | PUI | LE | PWI | D1 | D5 | D5 |
| 1 | 0 | 1 | 0 | 0 | 0 | 1 | | | | D1 | D6 | D4 |
| 1 | 0 | 1 | 0 | 0 | 1 | 0 | GE | PVI | GE | D1 | D6 | D4 |
| 1 | 0 | 1 | 0 | 0 | 1 | 1 | | | | D2 | D7 | D3 |
| 1 | 0 | 1 | 0 | 1 | 0 | 0 | PUI | LE | PWI | D2 | D7 | D3 |
| 1 | 0 | 1 | 0 | 1 | 0 | 1 | | | | D3 | D7 | D2 |
| 1 | 0 | 1 | 0 | 1 | 1 | 0 | GE | PVI | GE | D3 | D7 | D2 |
| 1 | 0 | 1 | 0 | 1 | 1 | 1 | | | | D4 | D6 | D1 |
| 1 | 0 | 1 | 1 | 0 | 0 | 0 | PUI | LE | PWI | D4 | D6 | D1 |
| 1 | 0 | 1 | 1 | 0 | 0 | 1 | | | | D5 | D5 | D1 |
| 1 | 0 | 0 | 0 | 0 | 0 | 0 | GE | PVI | PWI | D5 | D5 | D1 |
| 1 | 0 | 0 | 0 | 0 | 0 | 1 | | | | D6 | D4 | D1 |
| 1 | 0 | 0 | 0 | 0 | 1 | 0 | PUI | LE | LE | D6 | D4 | D1 |
| 1 | 0 | 0 | 0 | 0 | 1 | 1 | | | | D7 | D3 | D2 |
| 1 | 0 | 0 | 0 | 1 | 0 | 0 | GE | PVI | PWI | D7 | D3 | D2 |
| 1 | 0 | 0 | 0 | 1 | 0 | 1 | | | | D7 | D2 | D3 |
| 1 | 0 | 0 | 0 | 1 | 1 | 0 | PUI | LE | LE | D7 | D2 | D3 |
| 1 | 0 | 0 | 0 | 1 | 1 | 1 | | | | D6 | D1 | D4 |
| 1 | 0 | 0 | 1 | 0 | 0 | 0 | GE | PVI | PWI | D6 | D1 | D4 |
| 1 | 0 | 0 | 1 | 0 | 0 | 1 | | | | D5 | D1 | D5 |

TABLE 11
(part 2)

| Phase | | | PN stage | | | | Comparison circuit | | | Reference register | | |
|---|---|---|---|---|---|---|---|---|---|---|---|---|
| PUI | PVI | PWI | SC3 | SC2 | SC1 | SC0 | UTM | VTM | WTM | UTM | VTM | WTM |
| 1 | 1 | 0 | 0 | 0 | 0 | 0 | PUI | PVI | LE | D5 | D1 | D5 |
| 1 | 1 | 0 | 0 | 0 | 0 | 1 | | | | D4 | D1 | D6 |
| 1 | 1 | 0 | 0 | 0 | 1 | 0 | GE | GE | PWI | D4 | D1 | D6 |
| 1 | 1 | 0 | 0 | 0 | 1 | 1 | | | | D3 | D2 | D7 |
| 1 | 1 | 0 | 0 | 1 | 0 | 0 | PUI | PVI | LE | D3 | D2 | D7 |
| 1 | 1 | 0 | 0 | 1 | 0 | 1 | | | | D2 | D3 | D7 |
| 1 | 1 | 0 | 0 | 1 | 1 | 0 | GE | GE | PWI | D2 | D3 | D7 |
| 1 | 1 | 0 | 0 | 1 | 1 | 1 | | | | D1 | D4 | D6 |
| 1 | 1 | 0 | 1 | 0 | 0 | 0 | PUI | PVI | LE | D1 | D4 | D6 |
| 1 | 1 | 0 | 1 | 0 | 0 | 1 | | | | D1 | D5 | D5 |
| 0 | 1 | 0 | 0 | 0 | 0 | 0 | PUI | GE | PWI | D1 | D5 | D5 |
| 0 | 1 | 0 | 0 | 0 | 0 | 1 | | | | D1 | D6 | D4 |
| 0 | 1 | 0 | 0 | 0 | 1 | 0 | LE | PVI | LE | D1 | D6 | D4 |
| 0 | 1 | 0 | 0 | 0 | 1 | 1 | | | | D2 | D7 | D3 |
| 0 | 1 | 0 | 0 | 1 | 0 | 0 | PUI | GE | PWI | D2 | D7 | D3 |
| 0 | 1 | 0 | 0 | 1 | 0 | 1 | | | | D3 | D7 | D2 |
| 0 | 1 | 0 | 0 | 1 | 1 | 0 | LE | PVI | LE | D3 | D7 | D2 |
| 0 | 1 | 0 | 0 | 1 | 1 | 1 | | | | D4 | D6 | D1 |
| 0 | 1 | 0 | 1 | 0 | 0 | 0 | PUI | GE | PWI | D4 | D6 | D1 |
| 0 | 1 | 0 | 1 | 0 | 0 | 1 | | | | D5 | D5 | D1 |

TABLE 11
(part 3)

| Phase | | | PN stage | | | | Comparison circuit | | | Reference register | | |
|---|---|---|---|---|---|---|---|---|---|---|---|---|
| PUI | PVI | PWI | SC3 | SC2 | SC1 | SC0 | UTM | VTM | WTM | UTM | VTM | WTM |
| 0 | 1 | 1 | 0 | 0 | 0 | 0 | LE | PVI | PWI | D5 | D5 | D1 |
| 0 | 1 | 1 | 0 | 0 | 0 | 1 | | | | D6 | D4 | D1 |
| 0 | 1 | 1 | 0 | 0 | 1 | 0 | PUI | GE | GE | D6 | D4 | D1 |
| 0 | 1 | 1 | 0 | 0 | 1 | 1 | | | | D7 | D3 | D2 |
| 0 | 1 | 1 | 0 | 1 | 0 | 0 | LE | PVI | PWI | D7 | D3 | D2 |
| 0 | 1 | 1 | 0 | 1 | 0 | 1 | | | | D7 | D2 | D3 |
| 0 | 1 | 1 | 0 | 1 | 1 | 0 | PUI | GE | GE | D7 | D2 | D3 |
| 0 | 1 | 1 | 0 | 1 | 1 | 1 | | | | D6 | D1 | D4 |
| 0 | 1 | 1 | 1 | 0 | 0 | 0 | LE | PVI | PWI | D6 | D1 | D4 |

TABLE 11-continued (part 3)

| Phase | | | PN stage | | | | Comparison circuit | | | Reference register | | |
|---|---|---|---|---|---|---|---|---|---|---|---|---|
| PUI | PVI | PWI | SC3 | SC2 | SC1 | SC0 | UTM | VTM | WTM | UTM | VTM | WTM |
| 0 | 1 | 1 | 1 | 0 | 0 | 1 | | | | D5 | D1 | D5 |
| 0 | 0 | 1 | 0 | 0 | 0 | 0 | PUI | PVI | GE | D5 | D1 | D5 |
| 0 | 0 | 1 | 0 | 0 | 0 | 1 | | | | D4 | D1 | D6 |
| 0 | 0 | 1 | 0 | 0 | 1 | 0 | LE | LE | PWI | D4 | D1 | D6 |
| 0 | 0 | 1 | 0 | 0 | 1 | 1 | | | | D3 | D2 | D7 |
| 0 | 0 | 1 | 0 | 1 | 0 | 0 | PUI | PVI | GE | D3 | D2 | D7 |
| 0 | 0 | 1 | 0 | 1 | 0 | 1 | | | | D2 | D3 | D7 |
| 0 | 0 | 1 | 0 | 1 | 1 | 0 | LE | LE | PWI | D2 | D3 | D7 |
| 0 | 0 | 1 | 0 | 1 | 1 | 1 | | | | D1 | D4 | D6 |
| 0 | 0 | 1 | 1 | 0 | 0 | 0 | PUI | PVI | GE | D1 | D4 | D6 |
| 0 | 0 | 1 | 1 | 0 | 0 | 1 | | | | D1 | D5 | D5 |

This results in the production of the signals UP BF 916, VP BF 918, WP BF 920, UN BF 922, VN BF 924 and WN BF 926 shown in FIG. 21 and the signals are used as gate signals for the respective arms. Thus, the pulse width modulated signals each consisting of 15 unequal pulses are produced as shown in FIG. 21. By changing the data in the PN REG 720 of the reference register group 570 from the CPU 114, it is possible to produce signals each consisting of 9 or 3 pulses, and it is desirable to change the number in accordance with the frequency of the inverter.

Further, as regards the control of equal pulses, by placing a "0" in the bit 4-$M_4$ of the mode 0 register 556, the control can be effected by selecting only the D1 REG 706 of the reference register group 570.

On the other hand, placing a "0" in the bit 6-$M_6$ of the mode 0 register 556 results in the production of the pulse width modulated signals of FIG. 19 for the electric motor (commutatorless electric motor) with phase detector, and placing a "1" in the $M_6$ results in the production of the unequal-pulse type pulse width modulated signals of FIG. 21 for the induction motor.

Figure 24:
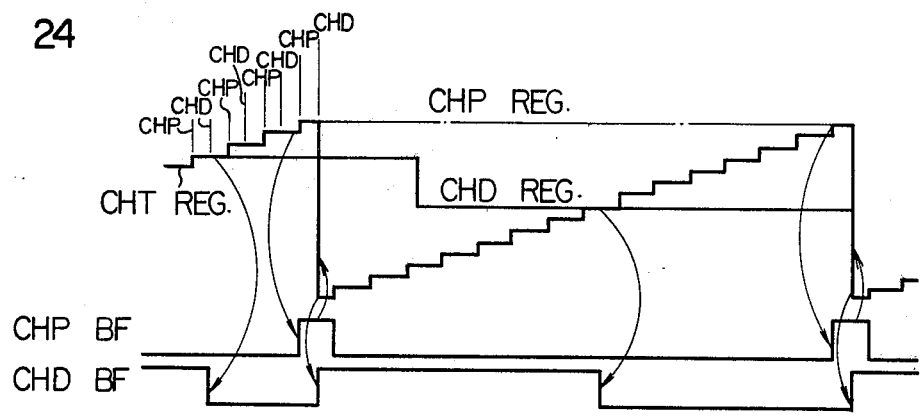
FIG. 24 is a time chart for explaining the generation of the chopper signal.

FIG. 24 is a time chart for explaining the production of a chopper signal CH. The chopper signal CH controls the duty cycle. As shown in FIG. 15, the reference register group 570 includes the CHP REG 724 for storing a chopper period data and the CHD REG 726 for storing an ON-time data. As a timer, the data is produced by the CHT REG 742 of the instantaneous register group 572.

In the case of the stage signal CHP-P process, the CHT REG 742 is unconditionally incremented and it is compared with the CHP REG 724. Thus, if a condition is satisfied that the stored data of the CHP REG 724 is not more than that of the CHT REG 742, a "1" is latched in the CHP FF 774 of the first comparison output latch group 602. Also, the CHP BF 930 of the second comparison output latch group 604 latches the output of the CHP FF 774 and the output of the CHP BF 930 goes to "1".

In the case of the stage signal CHD-P process, the CHT REG 742 is unconditionally not incremented. Also, the CHT REG 742 is reset when the output of the CHP BF 930 goes to "1". In this process, when a condition is satisfied that the stored data of the CHD REG 726 is not more than that of the CHT REG 742, a "1" is latched in the CHD FF 776 of the first comparison output latch group 602 and also the output of the CHD FF 776 is latched in the CHD BF 932 of the second comparison output latch group 604 causing its output to go to "1".

The inverted output of the CHD BF 932 is the desired chopper signal CH.

Figure 25:
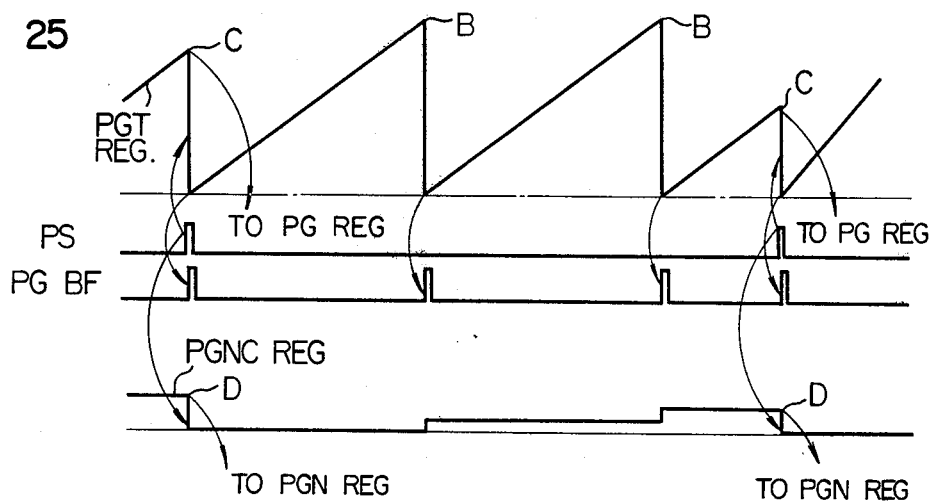
FIG. 25 is a time chart for explaining the timewise measurement of the pulse width of the external pulse signals.

FIG. 25 is a time chart for explaining the manner in which the pulse time width of the synchronized external pulse signal PS is measured by the PG and PGN processes with $M_2=0$ in the mode 0 register 556.

The measuring method is such that the measurement is started when the synchronized external pulse signal PS goes to "1". The time width to be measured is determined by the PGT REG 738 of the instantaneous register group 572.

In the case of the stage signal PG-P process, the PGT REG 738 of the instantaneous register group 572 is unconditionally incremented. However, if the pulse time width of the synchronized external pulse signal PS increases, an overflow condition occurs in the PGT REG 738 (at points B in FIG. 25). For this reason, the stage signal PGN-P process is performed to count the number of occurrences of an overflow condition.

Also, the stored data of the PGT REG 738 is compared with the stored data (usually containing only the "0"s) of the P0 REG 702 in the reference register group 570, so that if a condition is met that the stored data of the P0 REG 702 is not less than that of the PGT REG 738, a "1" is latched in the PG FF 780 of the first comparison output latch group 602. In addition, the PG BF 936 of the second comparison output latch group 604 latches the output of the PG FF 780 and thus the output of the PG BF 938 goes to "1" indicating that the PGT REG 738 has overflowed. Also, in the stage signal PGN-P process for counting the number of occurrences of an overflow, the PGNC REG 740 of the instantaneous register group 572 is incremented on condition that the overflow indicating PG BF 936 goes to "1".

In the case of the stage signal PG-P process, when the synchronized external pulse signal PS goes to "1", the data stored in the PGT REG 738 is transferred to and written in the PG REG 748 of the output register group 574 (at C in FIG. 25) and the PG REG 738 is reset. Also in the stage signal PGN-P process, the data stored in the PGNC REG 740 is transferred to and written into the PGN REG 750 of the output register group 574 (at D in FIG. 25) and the PGNC REG 740 is reset.

The pulse time width of the synchronized external pulse signal PS can be measured by means of the stored data in the PG REG 748 and PGN REG 750 of the output register group 574.

Figure 26:
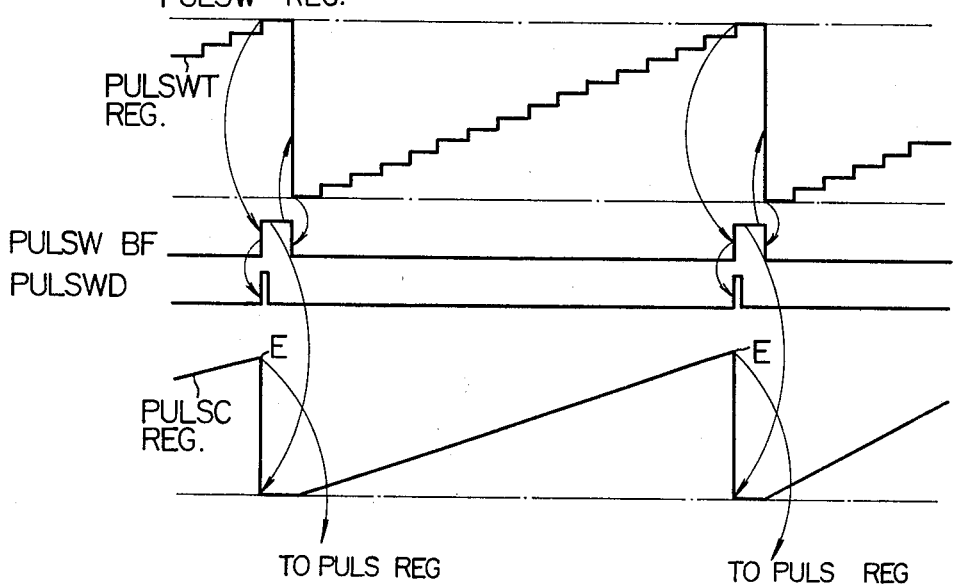
FIG. 26 is a time chart for explaining the counting of pulses in a given time interval.

FIG. 26 is a time chart for explaining the method and process of counting the number of the synchronized external pulse signals PS generated in a given time interval with M=1 in the mode 0 register 556.

The PULSWT REG 736 of the instantaneous register group 572 for measuring the time width is incremented unconditionally by the stage signal PULSW-P, and the PULSWT REG 736 is reset when the PULSW BF 928 of the second comparison output latch group 604 goes to "1". In addition, the stored data of the PULSW REG 722 of the reference register group 570 is compared with the stored data of the PULSWT REG 736 of the instantaneous register group 572, so that if a condition is satisfied that the stored data of the PULSW REG 722 is not more than that of the PULSWT REG 736, a "1" is latched in the PULSW FF 772 of the first comparison output latch group 602. Also the PULSW BF 928 of the second comparison output latch group 604 latches the output of the PULSW REG 772 and the output of the PULSW BF 928 goes to "1", thus determining the time interval.

In the stage signal PULS-P process, at PULSWD=1 indicating the positive-going transition of the PULSW BF 928, the stored data of the PULSC REG 738 of the instantaneous register group 572 indicating the count of the synchronized external pulse signals PS, is transferred to and written into the PULS REG 748 of the output register group 574 (at E in FIG. 26). On the other hand, when the PULSW BF 928 goes to "1", the PULSC REG 738 is reset providing the count of the synchronized external pulse signals PS within the time interval.

The PG-P and PGN-P processes of FIG. 25 and the PULS-P process of FIG. 26 are used to indicate the motor speed, and one or the other of the PG-P and PGN-P processes having an excellent accuracy at low speeds and the PULS-P process having an improved accuracy at high speeds is selected in accordance with the state of $M_2$ in the mode 0 register 556 of Table 2 which is written from the CPU 114.

Figure 27:
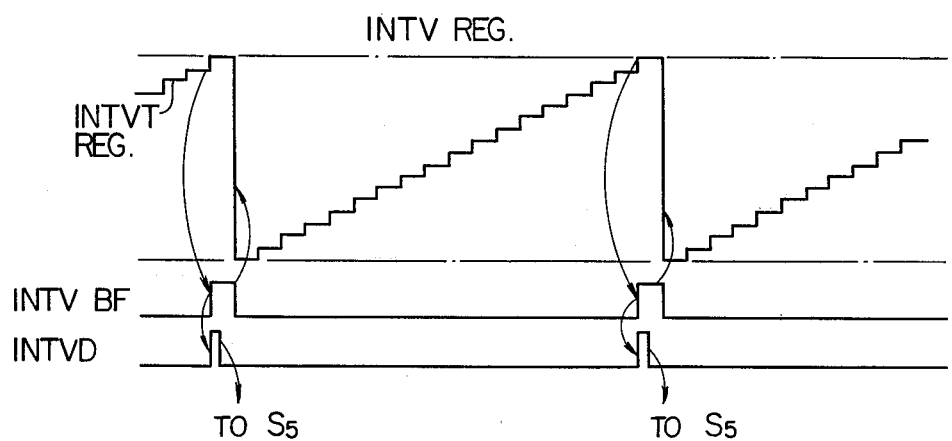
FIG. 27 is a time chart for explaining the generation of timer interruptions.

FIG. 27 is a time chart for explaining the stage signal INTV-P process which serves as a timer and applies an interrupt request to the CPU 114 at predetermined time intervals.

In this stage signal INTV-P process, the INTVT REG 742 of the instantaneous register group 572 for measuring a time interval, is unconditionally incremented and it is reset when the INTV BF 934 of the second comparison output latch group 604 goes to "1". Also, the stored data of the INTV REG 728 of the reference register group 570 is compared with that of the INTVT REG 744 of the instantaneous register group 572, so that if a condition is satisfied that the stored data of the INTV REG 728 is not more than the stored data of the INTVT REG 744, a "1" is latched in the INTV FF 778 of the first comparison output latch group 602. Also the INTV BF 934 of the second comparison output latch group 604 latches the output of the INTV FF 778 and the output of the INTV BF 934 goes to "1".

At INTVD=1 indicating the positive-going transition of the INTV BF 934, a "1" is written in the bit 5-$S_5$ of the status register 550 producing an interrupt request signal $\overline{IRQ}$ which is applied to the CPU 114.

Figure 28:
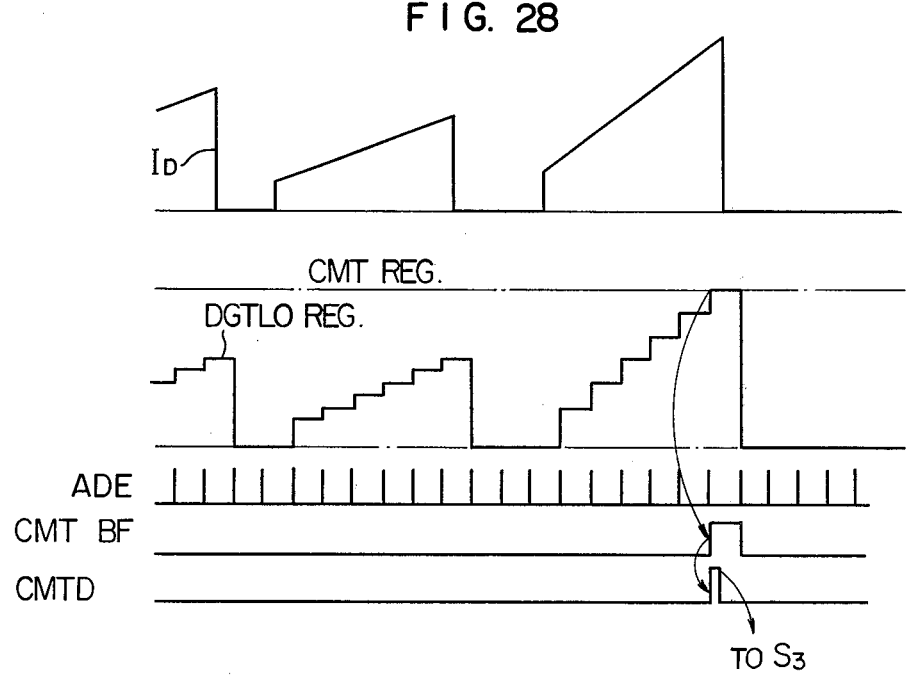
FIG. 28 is a time chart for explaining the current limiting operation.

FIG. 28 is a time chart for explaining the stage interrupt process for current limiting purposes.

The stage signal CMT-P process is not initiated at the expiration of any predetermined time interval but it is initiated when the A/D conversion end signal ADE from the current A/D converter 127 goes to "1".

The stage signal CMT-P process is performed as follows. The stored data of the DGTLO REG 546 or the A/D converted digital data from the current A/D converter 127 is compared with the stored data of the CMT REG 730 of the reference register group 570, so that if a condition is satisfied that the stored data of the CMT REG 730 is less than or equal to the stored data of the DGTLO REG 546, a "1" is latched in the CMT FF 782 of the first comparison output latch group 602. In addition, the CMT BF 937 of the second comparison output latch group 604 latches the output of the CMT FF 782 and the output of the CMT BF 937 goes to "1".

At CMTD=1 indicating the positive-going transition of the CMT BF 937, a "1" is written in the bit 3-$S_3$ of the status register 550 thereby producing an interrupt request signal $\overline{IRQ}$ which is applied to the CPU 114.

Also, at CMTD=1, the output pulse is cut off.

Figure 29:
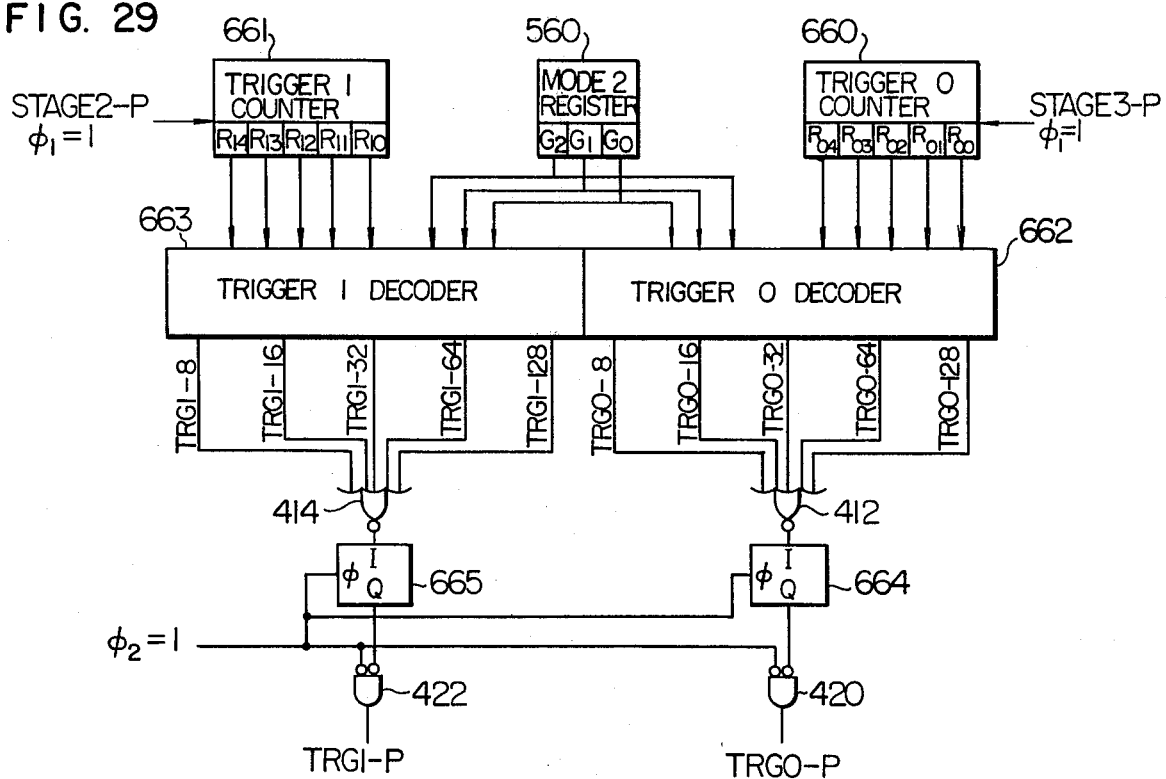
FIG. 29 is a circuit diagram of the signal generating circuit for the output controller.

FIG. 29 is a detailed circuit diagram of a circuit for generating trigger pulse signals TRG0-P and TRG1-P to control the output controller 666.

The trigger signals TRG0-P and TRG1-P are used to protect the power devices of the inverter arms. The output controller 666 has a protective function of compensating the minimum ON time and OFF time of the power devices and preventing the P-arm and N-arm power devices of the inverter from overlapping.

When the stage signal STAGE3-P-$\phi_1$ goes to "1", a trigger 0 counter 660 counts and its outputs $R_{00}$, $R_{01}$, $R_{02}$, $R_{03}$ and $R_{04}$ and the outputs $G_0$, $G_1$ and $G_2$ of the mode 2 register 560 are applied to a trigger 0 decoder 662 which in turn generates output signals TRG0-8, TRG0-16, TRG0-32, TRG0-64 and TRG0-128.

The following Table 12 shows the contents of the trigger 0 decoder 662. The output signals TRG0-8, TRG0-16, TRG0-32, TRG0-64 and TRG0-128 are applied to a five-input NOR circuit 412 whose output is latched by a latch circuit 664 which goes to the "T" stage at $\phi_2=1$. The clock signal $\phi_2$ and the output of the latch circuit 664 are applied to a two-input NOR circuit 420 which in turn generates a trigger pulse signal TRG0-P.

The other trigger pulse signal TRG1-P is generated by a trigger 1 decoder 663 as shown in Table 13 and the operation is the same as in the case of the trigger pulse signal TRG0-P.

While the pulses TRG0-8 and TRG1-8 are generated at intervals of 8 $\mu s$, the pulses TRG0-16 and TRG1-16 at intervals of 16 $\mu s$, the pulses TRG0-32 and TRG1-32 at intervals of 32 $\mu s$, the pulses TRG0-64 and TRG1-64 at intervals of 64 $\mu s$, and the pulses TRG0-128 and TRG1-128 at intervals of 128 $\mu s$, it is possible to use the signals TRG$_0$-1 and TRG$_1$-P as stage signals so as to generate the pulses at shorter time intervals. This time interval is the desired period of time for compensation and protecting purposes.

TABLE 12

| Trigger 0 signal | Trigger 0 counter | | | | | Mode 2 | | |
|---|---|---|---|---|---|---|---|---|
| | $R_{04}$ | $R_{03}$ | $R_{02}$ | $R_{01}$ | $R_{00}$ | $G_2$ | $G_1$ | $G_0$ |
| TRGO - 8 | x | x | x | x | 0 | 0 | 0 | 0 |
| TRGO - 16 | x | x | x | 0 | 0 | 0 | 0 | 1 |
| TRGO - 32 | x | x | 0 | 0 | 0 | 0 | 1 | 0 |
| TRGO - 64 | x | 0 | 0 | 0 | 0 | 0 | 1 | 1 |
| TRGO - 128 | 0 | 0 | 0 | 0 | 0 | 1 | 0 | 0 |

TABLE 13

| Trigger 1 signal | Trigger 1 counter | | | | | Mode 2 | | |
| --- | --- | --- | --- | --- | --- | --- | --- | --- |
|  | $R_{14}$ | $R_{13}$ | $R_{12}$ | $R_{11}$ | $R_{10}$ | $G_2$ | $G_1$ | $G_0$ |
| TRG1 - 8 | x | x | x | x | 0 | 0 | 0 | 0 |
| TRG1 - 16 | x | x | x | 0 | 0 | 0 | 0 | 1 |
| TRG1 - 32 | x | x | 0 | 0 | 0 | 0 | 1 | 0 |
| TRG1 - 64 | x | 0 | 0 | 0 | 0 | 0 | 1 | 1 |
| TRG1 - 128 | 0 | 0 | 0 | 0 | 0 | 1 | 0 | 0 |

Figure 30:
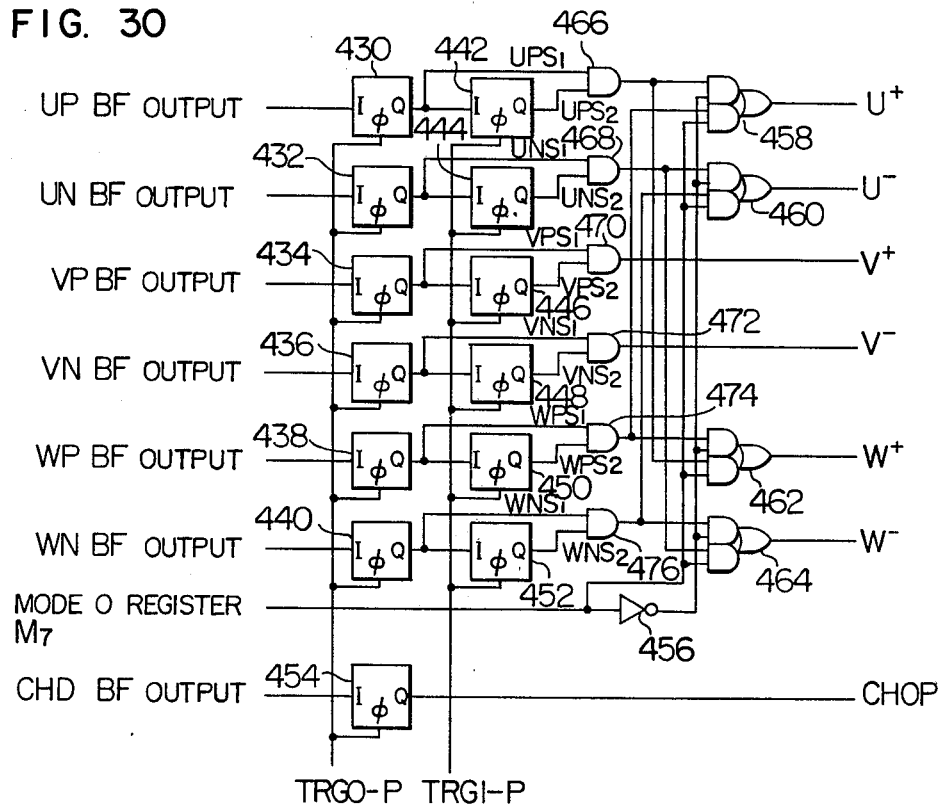
FIG. 30 is a detailed circuit diagram for the output controller.
Figure 31:
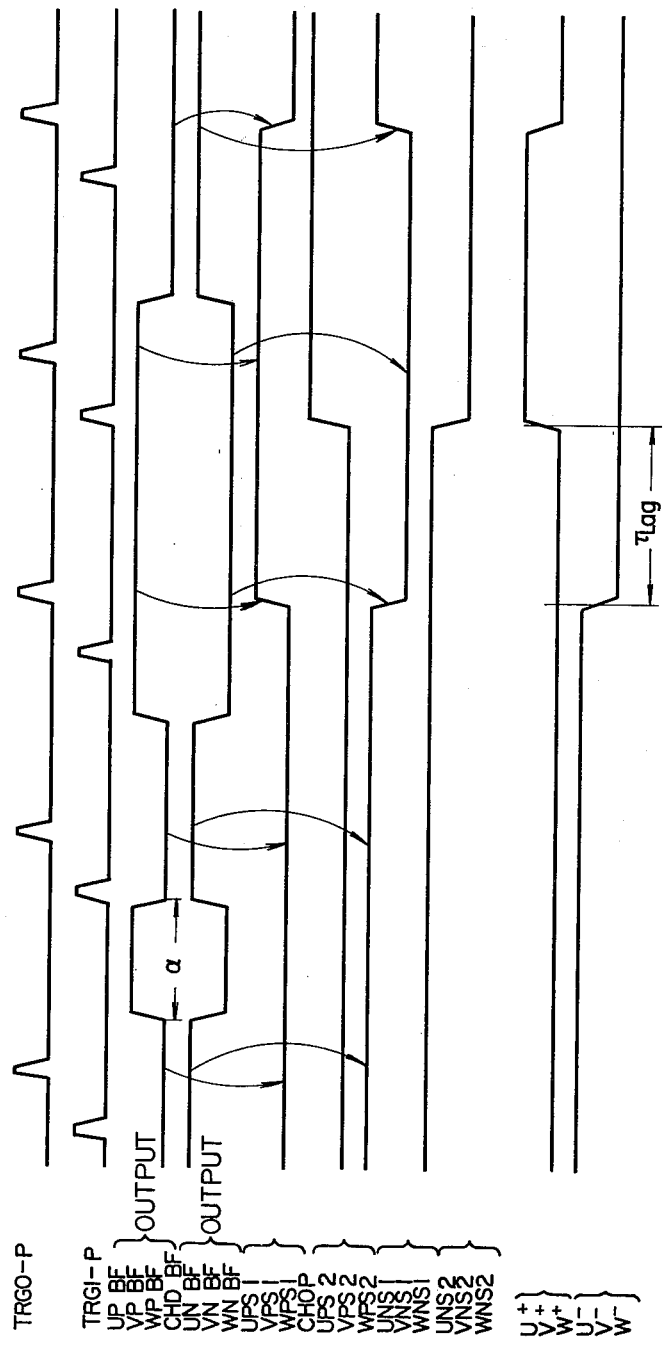
FIG. 31 is a time chart for explaining the operation of the output controller shown in FIG. 30.

FIG. 30 is a detailed circuit diagram of the output controller 666, and FIG. 31 shows its time chart.

The two pulse width modulated signals from the second comparison output latch group 604 or the UP BF 916 and UN BF 922 will now be described.

The output signal of the UP BF 916 becomes an input to a latch circuit 430 which becomes "through" when the trigger 0 pulse signal TRG0-P goes to "1". The latch circuit 430 generates an output signal UPS1 whose waveform becomes as shown in FIG. 31. Since the width α of the output signal from the UP BF 916 is shorter than the pulse width of the signal TRG0-1, no pulse is appearing in the waveform UPS1. Thus, the minimum ON time of the power devices can be compensated for.

The input to a latch circuit 432 which operates in the same manner as the latch circuit 430 is the output signal of the UN BF 922. The output signal UNS1 of the latch circuit 432 also has a waveform as shown in FIG. 31. Likewise as in the case of UPS1, no pulse corresponding to the α is appearing in the waveform UNS1. Thus, the minimum ON time of the power devices can be compensated for.

The output signal UPS1 of the latch circuit 430 is applied to the input of a latch circuit 442 which goes to the "T" state when the trigger 1 pulse signal TRG1-P goes to "1" and the latch circuit 442 generates an output signal UPS2. The output signals UPS1 and UPS2 are applied to an AND circuit 466 which in turn generates an output signal U+. On the other hand, the output signal of the latch circuit 432 is applied to the input of a latch circuit 444 which goes to "T" when the trigger 1 pulse signal TRG1-P goes to "1" and the latch circuit 444 generates an output signal UNS2. The output signals UNS1 and UNS2 are applied to an AND circuit 468 which in turn generates an output signal U-. The output signal U+ serves as a gate signal for the P-side arm of the inverter and the output signal U- serves as a gate signal for the N-side arm. As shown in FIG. 31, a non-overlapping time interval $\tau_{Lag}$ is provided for the signals U+ and U- so that at the expiration of the time interval $\tau_{Lag}$ after the application of an OFF signal U-, the N-arm power device is turned off completely and thus an ON signal U+ is generated thereby turning the P-arm power device on.

On the other hand, the relation between the VP BF 918 and VN BF 924 and the relation between the WP BF 920 and WN BF 926 in the second comparison output latch group 604 are the same with that between the UP BF 916 and UN BF 922.

Also, the relation between the output of the CHD BF 932 and the signal CHOP is the same with that between the output of the UP BF 918 and the output signal UPS1 of the latch circuit 430, and the minimum ON time and the minimum OFF time can be compensated for.

In FIG. 30, selectors 458, 460, 462 and 464 are controlled in accordance with the bit 7-$M_7$ of the mode 0 register 556. When $M_7$=0, the outputs of the UP BF 916 and UN BF 922 are associated with the gate signals U+ and U- and the outputs of the WP BF 920 and WN BF 926 are associated with the gate signals W+ and W-, causing the electric motor to rotate in the forward direction. However, when $M_7$=1, the outputs of the WP BF 920 and WN BF 926 are associated with the gate signals U+ and U- and the outputs of the UP BF 916 and UN BF 922 are associated with the gate signals W+ and W-, causing the electric motor to rotate in the reverse direction.

In this way, the output pulse signals including the pulse width modulated gate signals U+, U-, V+, V-, W+ and W- and the chopper signal CHOP are completely compensated for or protected and they are then supplied to the gate driver 130.

The method of setting the reference data in the reference register group 570 will now be described.

For instance, to produce the pulse width modulated signals shown in FIG. 4, a speed command $S_P$ is subjected to A/D conversion and then taken into the CPU 114. In accordance with the frequency determined by the speed command $S_P$, the corresponding effective voltage and the number of unequal pulses for the electric motor 102 are obtained by computation or the data stored in the form of a map. The frequency data are set in the P0 REG 702 and P1 REG 704, and the pulse number data and the modulated wave data for determining the effective voltage are respectively set in the PN REG 720 and the D1 to D7 REG 706 to 718. This data setting results in the production of the pulse width modulated signals of FIG. 4. In addition, if it is desired to change the effective voltage of the motor 102, the necessary computational operations are performed in the CPU 114 and the resulting data are set in the D1 to D7 REG 706 to 718, thereby producing the required pulse width modulated signals.

The chopper signal CHOP is produced as follows. As shown in FIG. 24, in accordance with the conditions of the motor the corresponding period and ON-time data are obtained through the computational operations in the CPU 114 or from the data in map form and are set in the CHP REG 724 and CHD REG 726, thereby generating a signal for controlling the energization period of the power devices.

FIGS. 25 and 26 relate to the motor speed measurement. FIG 25 relates to the method of measuring the speed of the motor at the low speed operation. The time width of an external pulse signal is measured so that the resulting data are stored in the PG REG 748 and PGN REG 750 of the output register group 574 and the data are then introduced into the CPU 114. The time width T is computed as follows.

$$T = \text{(stored data of PGN REG 750)} \times 2048 \ \mu s \\ + \text{(stored data of PG REG 748)} \times 8 \ \mu s$$

In this way, the motor speed is measured.

FIG. 26 relates to the method of counting the number of external pulses in a predetermined time interval whereby the data obtained is stored in the PULS REG 748 and then transferred to the CPU 114. The time interval is determined by setting the desired data in the PULSW REG 722.

The timer interrupt request to the CPU 114 is used in cases where the use of a timer is needed from the standpoint of program preparation and the interrupt request is produced by setting the desired time data in the INTV REG 728.

The current limiting process which is performed by the stage interruption is carried out by setting the desired limit value data in the CMT REG 730. The request for stage interrupt is generated after the completion of the A/D conversion.

In accordance with the present invention, the irregularly applied external signals are synchronized with the stage signals thus ensuring accurate detection of the signals.

Further, with the embodiment described above, in the sequence of stages, the stages to be detected can be reduced in length according to the accuracy, and moreover the use of the synchronized signals in the processes ensures accurate detection even at high speed operation of the motor.

In accordance with the embodiment described above, by virtue of the fact that the apparatus comprises a reference register group, an instantaneous register group and a comparison output latch group whereby the data from the selected registers of the register groups are applied to a comparison circuit in accordance with a stage counter, there is the advantage of ensuring many different motor controlling functions by means of a relatively simply circuitry.

Further, by using an RAM for the registers of the reference register group or the like, it is possible to use it as an RAM for the data from the CPU 114.

I claim:

1. An apparatus for controlling an electric motor comprising:
    (a) detecting means for generating a plurality of detection signals indicative of the operating conditions of an electric motor;
    (b) digital computing circuit means for performing digital computational operations on said detection signals to produce a plurality of digital control amounts;
    (c) first storage means for retaining said plurality of digital control amounts as a plurality of reference data;
    (d) second storage means for retaining a plurality of instantaneous data indicative of the instantaneous operating conditions of said electric motor;
    (e) comparison circuit means for comparing said reference data with selected ones of said instantaneous data in a time-divisional manner;
    (f) third storage means for retaining a plurality of comparison result data corresponding to said plurality of digital control amounts;
    (g) stage signal generating means for producing a plurality of stage signals for enabling said comparison circuit means to perform said time-divisional comparison operations, said stage signals being supplied to said comparison circuit means and said first, second and third storage means in a corresponding relation with said plurality of digital control amounts;
    (h) means responsive to each of said stage signals for selecting one of said plurality of comparison result data corresponding to a selected one of said digital control amounts; and
    (i) means responsive to said selected comparison result data for generating control signals for said electric motor.

2. A control apparatus according to claim 1, wherein said digital computing circuit means includes a central processor, wherein said first storage means comprises a group of reference registers for storing said plurality of reference data supplied from said central processor, each of said reference registers in said reference register group being addressable by said central processor such that said reference data are applied to and retained in addressed ones of said registers, wherein said second storage means comprises a group of instantaneous registers for retaining said plurality of instantaneous data, said instantaneous register group being connected to a latch circuit and incrementer/decrementer means so as to serve a counter function, wherein said comparison circuit means receives the reference data from selected one of the registers in said reference register group and the instantaneous data from selected one of the registers in said instantaneous register group, and wherein said third storage means comprises a first and a second comparison output latch group each functioning as a comparison result holding circuit whereby each said comparison result is set in associated one of the latches in said first comparison output latch group and then each said comparison result is set in associated one of the latches in said second comparison output latch group.

3. A control apparatus according to claim 1, further comprising a non-overlap circuit responsive to an enable signal from said central processor for producing a first and a second clock signal, and wherein said stage signal generating circuit comprises a stage counter, a stage decoder, and a stage latch circuit, said stage counter starting count in response to said first clock signal, and said stage latch circuit being connected to receive an output of said stage decoder and to store the same in response to said second clock signal.

4. A control apparatus according to claim 1, further comprising a synchronizing circuit which includes a first and a second latch circuit and a logic output circuit, said first latch circuit latching a plurality of external signals in response to a first clock signal, said second latch circuit latching a plurality of output signals from said first latch circuit in response to a second clock signal, said second clock signal having a predetermined time lag from said first clock signal, and said logic output circuit producing an exclusive logical sum of corresponding output signals from said first and second latch circuits.

5. A control apparatus according to claim 1, wherein said control signal generating means comprises a first and a second latch group and an output logical circuit, said first latch group latching a plurality of output signals from said third storage means in response to a first clock signal, said second latch group latching a plurality of output signals from said first latch group in response to a second clock signal, said second clock signal having a predetermined time lag from said first clock signal, and said output logical circuit producing a logical product of said output signal from said first and second latch groups.

6. A control apparatus according to claim 2, wherein said incrementer/decrementer means comprises an incrementer/decrementer, an incrementer/decrementer controller, and a control signal generating circuit, said incrementer/decrementer controller generating in response to said stage signals a first, a second and a third signal for respectively performing a first, a second and a third function, said first function consisting of an increment/decrement function for increasing or decreasing the value of each input data by 1, said second function consisting of a non-increment/non-decrement function for passing each input data as such without any increment or decrement, and said third function consisting of a resetting function for changing each input data to a data indicative of a zero value, and said control signal generating circuit selecting one of said first, second and third signals from said incrementer/decrementer controller so as to supply the same to said incrementer/decrementer.

7. A control apparatus according to claim 2, further comprising an analog/digital converter for exclusively converting a current flowing through a controlled rectifier element into a digital amount, said stage signal generating means producing an interrupt request signal in response to an analog/digital conversion end signal, said comparison circuit means comparing said digital amount of current produced from said analog/digital converter with a corresponding one of said reference data in response to said interrupt request signal, and an output signal from said comparison circuit means resetting said second comparison output latch group.

8. A control apparatus according to claim 3, wherein said stage decoder comprises a read-only memory.

9. A control apparatus according to claim 3, wherein said stage decoder is of a microprogrammed type.

10. A control apparatus according to claim 4, wherein said detecting means comprises a pulse generator for supplying its output to one of the inputs of said synchronizing circuit to detect a rotational speed of said electric motor.

11. A digital apparatus for controlling an electric motor comprising:
a reference register group including a plurality of reference registers for storing reference data relating to the desired operation of said electric motor;
counter means for selectively producing an increasing or decreasing count value;
comparing means having a first input connected to said reference register group and a second input connected to said counter means for comparing the reference data stored in a selected reference register to the count value of said counter means;
sequencer control means for selectively enabling said reference registers while controlling the increasing and decreasing of said counter means in accordance with a predetermined sequence;
comparison output means for storing the outputs of said comparing means which indicate the comparison result associated with said selected reference registers; and
means for controlling said electric motor on the basis of the data stored in said comparison output means.

12. A digital apparatus according to claim 11, further including central processor means for selectively supplying reference data to the reference registers of said reference register group.

13. A digital apparatus according to claim 11, wherein said counter means comprises an instantaneous register group including a plurality of instantaneous registers for storing respective count values and modifying means for selectively modifying the count values stored in said instantaneous registers, said sequencer control means including means for selectively enabling said instantaneous registers to have the count value stored therein modified by said modifying means in accordance with said predetermined sequence.

14. A digital apparatus according to claim 13, further including means for generating first and second sequential clock signals and latch circuit means connected in loop with said instantaneous register group and said modifying means so as to receive and store a count value supplied from a selected instantaneous register in time with said first clock signal and send the stored value back to said selected instantaneous register in time with said second clock signal.

15. A digital apparatus according to claim 14, wherein said latch circuit means is connected between said instantaneous register group and said modifying means.

16. A digital apparatus according to claims 12 or 14, wherein said modifying means comprises means for incrementing, decrementing or resetting the count value of a selected instantaneous register.

17. A digital apparatus according to claim 16, wherein said sequencer control means includes means responsive to selected data stored by said comparison output means for controlling the operation of said modifying means.

18. A digital apparatus according to claim 11, wherein said comparing means includes decision means responsive to the data received at said first and second inputs for performing the operations of selectively determining whether one input is equal to or more than the other input and whether one input is equal to or less than the other input and comparison controller means responsive to said sequencer control means for selecting the result of one of the operations of said decision means.

19. A digital apparatus according to claim 11, wherein said counter means comprises an instantaneous register for storing a count value and modifying means responsive to said sequencer control means for modifying the count value in said instantaneous register including selective updating of said count value and the resetting thereof, said sequence control means including controller means responsive to selected data stored in said comparison output means for controlling the operation of said modifying means.

20. A digital apparatus according to claim 19, wherein said comparison output means comprises first storage means for storing the data received from said comparing means and second storage means for storing the data stored in said storage means, and further including means for generating first and second sequential clock signals, said first storage means receiving and storing data from said comparing means in time with said first clock signal and said second storing means receiving and storing data from said first storing means in time with said second clock signal.

21. A digital apparatus according to claim 12, wherein said sequencer control means comprises stage counter means for producing frequency divided clock signals, period designating means for storing a timing designation of the selection timing of said sequencer control means and stage decoder means responsive to said stage counter means and said period designating means for generating register designating signals for enabling selective reference registers of said reference register group.

22. A digital apparatus according to claim 21, further including means responsive to said central processing means for selectively changing the timing designation stored in said period designating means.

23. A digital apparatus according to claims 21 or 22, further including means for generating sequential first and second clock signals, and sequencer control means further including latch circuit means responsive to said first clock signal for storing the output of said stage decoder means, said second clock signal being frequency divided by said stage counter means.

24. A digital apparatus for controlling an electric motor comprising:
  generating means for generating a carrier wave for pulse modulation;
  means including a plurality of data registers for storing data simulating a monitor signal having an A.C. waveform;
  comparing means for comparing the instantaneous value of said carrier wave from said generating means and said monitor signal from a selected data register and for producing an output representative of the comparison result;
  a pulse modulation circuit for generating pulse modulation signals for controlling said electric motor in response to the output of said comparing means; and
  sequencer control means for repeatedly generating a designating signal for enabling said generating means to provide its output to said comparing means and for selecting one of said data registers to supply the data stored therein to said comparing means at a much-shorter period than that of the output from said pulse modulation circuit.

25. A digital apparatus according to claim 24, wherein said generating means for generating said carrier wave comprises first counter means responsive to said sequencer control means producing a sequentially increasing or decreasing count value.

26. A digital apparatus according to claim 25, wherein said first counter means includes a first register for storing said count value, modifying means for selectively incrementing or decrementing said count value and means for transferring said count value from said first register to said modifying means and from said modifying means to said first register successively under control of said sequencer control means.

27. A digital apparatus according to claim 26, wherein said generating means further includes an upper limit register for storing an upper limit count value, said sequencer control means including means for periodically applying the count value in said register and the count value in said upper limit register to said comparing means and for producing a first switching signal to switch the operation of said modifying means from incrementing or decrementing when said count value in said first register is equal to or greater than said upper limit count value.

28. A digital apparatus according to claim 27, wherein said generating means further includes a lower limit register for storing a lower limit count value which is periodically compared to the count value in said first register by said comparing means under control of said sequencer means to produce a second switching signal to switch the operation of said modifying means for decrementing to incrementing when the count value in said first register is equal to or less than said lower limit count value.

29. A digital apparatus according to claim 28, wherein said comparing means includes a comparator capable of producing a first output indicating whether one input thereto is equal to or less than the other input thereto and a second output indicating whether the one input thereto is equal to or more than the other input thereto, and means for selecting said first output from said comparator when the count value in said first register reaches said upper limit count value and for selecting said second output from said comparator when the count value in said first register reaches said lower limit count value.

30. A digital apparatus according to claim 28, further including second counter means responsive to said generating means for counting the cycles of said carrier wave, means connected to said second counter means for producing a phase selection signal when the count of said second counter means reaches a preselected value and for then setting said second counter means, means responsive to said phase selection signal for generating a plurality of respective phase signals, and controller means responsive to said sequencer control means, said phase selection signal and said respective phase signals for controlling the selection of said data registers.

31. A digital apparatus according to claim 30, wherein said controller means includes a counter driven by one of said first and second switching signals and reset by said phase selection signal and pulse width modulation decoder means responsive to said counter, said respective phase signals and said sequencer control means for producing data register selection signals.

32. A digital apparatus for controlling an electric motor comprising:
  generating means for generating a carrier wave for pulse modulation including first counter means for producing successive increasing and decreasing count values between upper and lower count values to produce an output representing said carrier wave;
  phase detector means for producing a pulsed phase signal which is synchronized with the rotation of the electric motor and which is applied to said generating means for periodically resetting said counter means;
  means including a plurality of data registers for storing first and second fixed count values;
  comparing means for comparing the instantaneous output of said generating means with the count value stored in a selected one of said data registers and for producing an output representative of the comparison result;
  a pulse modulation circuit for generating pulse modulation signals for controlling said electric motor in response to the output of said comparing means; and
  sequencer control means for repeatedly generating a designating signal for enabling said generating means to provide its output to said comparing means and for selecting one of said data registers to supply the count value stored therein to said comparing means at a much-shorter period than that of the output from said pulse modulation circuit.

33. A digital apparatus according to claim 32, wherein said first counter means includes a first register for storing said count value, modifying means for selectively incrementing or decrementing said count value and means for transferring said count value from said first register to said modifying means and from said modifying means to said first register successively under control of said sequencer control means.

34. A digital apparatus according to claim 33, wherein said generating means further includes an upper limit register for storing an upper limit count value, said sequencer control means including means for periodically applying the count value in said first register and the count value in said upper limit register to said comparing means and for producing a first switching signal to switch the operation of said modifying means from incrementing to decrementing when said count value in said first register is equal to or greater than said upper limit count value.

35. A digital apparatus according to claim 34, wherein said generating means further includes a lower limit register for storing a lower limit count value which is periodically compared to the count value in said first register by said comparing means under control of said sequencer means to produce a second switching signal to switch the operation of said modifying means from decrementing to incrementing when the count value in said first register is equal to or less than said lower limit count value.

36. A digital apparatus according to claim 32, further including second counter means responsive to said generating means for counting the cycles of said carrier wave, output register means for storing a count value received from said second counter means, and means responsive to the pulsed phase signal produced by said phase detector means for transferring the count value of said second counter means to said output register means and for resetting said second counter means.

37. A digital apparatus according to claims 24 or 32, wherein said sequencer control means comprises stage counter means for producing frequency divided clock signals, period designating means for storing a timing designation of the selection timing of said sequencer control means and stage decoder means responsive to said stage counter means and said period designating means for generating register designating signals for enabling selective data registers.

38. A digital apparatus according to claim 37, wherein said sequencer control means further includes mode selection means responsive to a selection control signal for controlling said stage decoder means in the enabling of said data registers.

39. A digital apparatus for controlling an electric motor, comprising:
  switching means responsive to a pulse control signal for controlling the current to be supplied to the motor;
  a first register for storing a first count value for setting a chopper period;
  a second register for storing a second count value representing the on-duty portion of said chopper period;
  counter means for producing an increasing count value at a predetermined rate;
  comparing means for selectively comparing the count value of said counter means with said first and second count values as stored in said first and second registers;
  a third register for storing the comparison result of said comparing means as said pulse control signal; and
  sequencer control means for periodically connecting said counter means and said first register to said comparing means and for resetting said counter means when the count value stored in said first register is not more than the count value of said counter means and for periodically connecting said counter means and said second register to said comparing means and storing the comparison result thereof in said third register.

40. A digital apparatus according to claim 39, wherein said sequencer control means includes means for alternately generating first and second designating signals for selecting said first and second registers, respectively, for connection to said comparing means along with said counter means.

41. A digital apparatus according to claim 40, wherein said counter means comprises a fourth register for storing a count value and an incrementing circuit responsive to said sequencer control means for incrementing said count value in said fourth register and for applying the incremented count value to said comparing means in accordance with said first designating signal and back to said fourth register to be stored therein.

42. A digital apparatus according to claim 41, wherein said sequencer control means includes means responsive to the output of said comparing means at the time of generation of said second designating signal for resetting said fourth register to zero when the count value stored in said first register is not more than the incremented count value.

43. A digital apparatus for controlling an electric motor, comprising:
  detecting means responsive to a request signal for detecting an operating condition of the motor and for storing a digital signal representative thereof;
  reference register means for storing reference data for controlling the electric motor;
  counter means for producing monitor data relating to electric motor operation;
  comparing means for comparing the output of said counter means to the data stored in said reference register means;
  means for controlling said electric motor in response to the comparison result produced by said comparing means;
  sequencer control means for generating designating signals to selectively connect said reference register means and said counter means to said comparing means; and
  means for inhibiting said sequencer means from generating said designating signals and for generating said request signal to cause said detecting means to detect an operating condition of said motor and to store said digital signal representative thereof.

44. A digital apparatus according to claim 43, wherein said detecting means comprises means for detecting the level of the current supplied to said motor and converting means for producing said digital signal representative thereof, said reference register means including a register for storing a reference current value, said inhibiting means including means for generating a designating signal for selectively connecting said register storing said reference current value and said detecting means to said comparing means.

45. A digital apparatus according to claim 44, wherein said converting means comprises an A/D converter which produces an end signal upon completion of its converting operation for enabling said inhibiting means.

46. A digital apparatus according to claim 45, wherein said sequencer control means comprises stage counter means for producing frequency divided clock signals, period designating means for storing a timing designation of the selection timing of said sequencer control means and stage decoder means responsive to said stage counter means and said period designating means for generating register designating signals.

47. A digital apparatus according to claim 46, further including means for generating sequential first and second clock signals, said sequencer control means further including latch circuit means responsive to said first clock signal for storing the output of said stage decoder means, said second clock signal being frequency divided by said stage counter means.

48. A digital apparatus according to claim 47, wherein said inhibiting means includes means for resetting said latch circuit means.

49. A digital apparatus for controlling an electric motor comprising:
   phase detector means for producing pulses in synchronism with the rotation of said electric motor;
   first counter means for producing an increasing count value at a predetermined rate up to a maximum preselected count value at which an overflow condition occurs causing resetting thereof;
   second counter means for counting the overflow conditions of said first counter means;
   output register means for storing the count values of said first and second counter means;
   control means for transferring the count values of said first and second counter means to said output register means in response to the pulses produced by said phase detector means and for thereafter resetting said first and second counter means; and
   central processing means responsive to the count values stored in said output register means for detecting the rotating speed of said motor.

50. A digital apparatus according to claim 49, wherein said first counter means comprises a count register for storing a count value, incrementing means for incrementing the count value stored in said count register and sequencer means for periodically connecting said count register to said incrementing means at said predetermined rate to increase the count value stored therein until said overflow condition occurs.

51. A digital apparatus for controlling an electric motor, comprising:
   phase detector means for producing pulses in synchronism with the rotation of said electric motor;
   first counter means responsive to the pulses produced by said phase detector means for producing an increasing count value;
   reference register means for storing a preselected reference count value;
   second counter means responsive to timing pulses at a predetermined fixed frequency for producing an increasing count value;
   comparing means for comparing the increasing count value of said second counter means with the reference count value stored in said reference register means and for resetting said second counter means when said increasing count value thereof is not less than said reference count value; and
   output register means for storing the count value produced by said first counter means;
   sequencer means responsive to said comparing means for transferring the count value of said first counter means to said output register means prior to the resetting of said first counter means in response to said comparing means detecting that said increasing count value of said second counter means is not less than said reference count value; and
   central processing means responsive to the count value in said output register means for detecting the rotating speed of said motor.

52. A digital apparatus according to claim 51, wherein said central processing means includes means for selectively changing the reference count value stored in said reference register means.

53. A digital apparatus according to claim 51, wherein said first counter means includes a count register for storing said increasing count value and incrementing means for incrementing the count value stored in said count register, said sequencer means including means responsive to the pulses produced by said phase detector means for connecting said count register to said incrementing means to increase the count value stored therein.

54. A digital apparatus according to claim 51, wherein said second counter means includes a count register for storing said increasing count value and incrementing means for incrementing the count value stored in said count register, said sequencer means including means for connecting said count register to said incrementing means to increase the count value stored in said second count register in response to receipt of said timing pulses.

55. A digital apparatus according to claims 50 or 51, wherein said central processing means includes means for producing a clock signal, and wherein said phase detector means includes means for synchronizing said pulses to said clock signal.

56. A digital apparatus according to claims 24 or 32, further including means for supplying power to said electric motor and switching means including a plurality of switching elements connected in the form of a bridge circuit between said power supplying means and said electric motor for controlling said electric motor in response to the output of said pulse modulation circuit which produces pulse signals for selectively turning said switching elements on and off in a controlled manner.

57. A digital apparatus according to claim 56, wherein said pulse modulation circuit comprises output controller means including first and second latch circuits for storing selected outputs from said comparing means, means for generating turn-on pulses to be applied to respective switching elements of said switching means in response to the data stored in said second latch circuits and timing means responsive to said sequencer control means for generating a first trigger pulse for storing said selected outputs from said comparing means in said first latch circuits and a second trigger pulse for storing the data in said first latch circuits into said second latch circuits, said first and second trigger pulses being separated in time by a period correlated to the turn-off time of said switching elements.

58. A digital apparatus according to claim 57, wherein said timing means includes trigger counter means responsive to said sequencer control means for producing frequency divided clock signals, trigger decoder means responsive to said frequency divided clock signals for generating said first and second trigger pulses, and mode selection means storing a designation representing a selected time interval for controlling said trigger decoder means to generate said first and second trigger pulses separated by said selected time interval.

59. A digital apparatus according to claim 57, wherein said means for generating turn-on pulses comprises logic means responsive to a direction selecting signal for controlling the sequence of selection of data in said second latch circuits so as to control the direction of rotation of said electric motor and mode register means for storing said direction selecting signal, said central processing means including means for selectively changing the direction selecting signal stored in said mode register means.

60. A digital apparatus according to claim 39, further including at least one latch circuit for storing said pulse control signal to be applied to said switching means and timing means responsive to said sequencer control means for generating a trigger pulse to cause the data stored in said third register to be latched in said latch circuit.

* * * * *